US012707346B2

(12) United States Patent
Prasad et al.

(10) Patent No.: US 12,707,346 B2
(45) Date of Patent: Aug. 11, 2026

(54) HANDOVER MANAGEMENT IN A SYNCHRONIZATION SYSTEM

(71) Applicant: QUALCOMM Incorporated, San Diego, CA (US)

(72) Inventors: Abhishek Prasad, Cambridge (GB); Nicolas Graube, Cambridge (GB); Tingting Liu, Cambridge (GB); Laksh Bhatia, Cambridge (GB); Joe Thomas, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 18/160,921

(22) Filed: Jan. 27, 2023

(65) Prior Publication Data

US 2024/0259895 A1 Aug. 1, 2024

(51) Int. Cl.
*H04W 36/36* (2009.01)
*H04W 36/00* (2009.01)
(Continued)

(52) U.S. Cl.
CPC ....... *H04W 36/0072* (2013.01); *H04W 36/08* (2013.01); *H04W 36/249* (2023.05); *H04W 36/30* (2013.01)

(58) Field of Classification Search
None
See application file for complete search history.

(56) References Cited

U.S. PATENT DOCUMENTS 8,665,743 B2 * 3/2014 Zhu ........................ G01S 5/0278 370/252
2006/0034224 A1 * 2/2006 Nakamata ............. H04W 36/18 370/252

(Continued)

FOREIGN PATENT DOCUMENTS

EP 3493635 A1 6/2019
WO 2022105860 A1 5/2022
WO WO-2023131006 A1 * 7/2023 ............ H04W 72/04

OTHER PUBLICATIONS

International Search Report and Written Opinion—PCT/US2023/082184—ISA/EPO—Mar. 28, 2024.

(Continued)

*Primary Examiner* — Kodzovi Acolatse
(74) *Attorney, Agent, or Firm* — Polsinelli

(57) ABSTRACT

Disclosed are systems, apparatuses, processes, and computer-readable media for wireless communications. For example, a process can include determining, by a network entity, a handover candidate wherein the handover candidate is a wireless communication device of a plurality of wireless communication devices associated with the network entity. The network entity can transmit to each network device of a plurality of network devices, channel information and scheduling information associated with the handover candidate and can receive, from each network device of the plurality of network devices, energy information associated with a pre-determined packet received by each network device of the plurality of network devices. The network entity can determine a target network device for a handover associated with the handover candidate based on the received energy information.

28 Claims, 9 Drawing Sheets

(51) Int. Cl.

| | |
|---|---|
| ***H04W 36/08*** | (2009.01) |
| ***H04W 36/24*** | (2009.01) |
| ***H04W 36/30*** | (2009.01) |

(56) References Cited

U.S. PATENT DOCUMENTS

| | | | | |
|---|---|---|---|---|
| 2006/0133543 | A1 | 6/2006 | Linsky et al. | |
| 2009/0010222 | A1 | 1/2009 | Jechoux | |
| 2010/0124203 | A1 * | 5/2010 | Tenny | H04W 36/08 370/331 |
| 2016/0353320 | A1 * | 12/2016 | Hongo | H04W 4/027 |
| 2017/0171833 | A1 | 6/2017 | Vamaraju et al. | |
| 2018/0352551 | A1 | 12/2018 | Lou et al. | |
| 2021/0099928 | A1 * | 4/2021 | Wang | H04L 43/16 |
| 2022/0051310 | A1 | 2/2022 | Graube et al. | |
| 2023/0292229 | A1 | 9/2023 | Ding et al. | |
| 2024/0276354 | A1 * | 8/2024 | Lee | H04W 48/10 |
| 2024/0396696 | A1 * | 11/2024 | Zhan | H04L 5/0073 |
| 2025/0031168 | A1 * | 1/2025 | Rumpf | H04W 52/0206 |

OTHER PUBLICATIONS

Woolley M., "The Bluetooth Low Energy Primer 1.1.0", Bluetooth Special Interest Group, Jan. 17, 2023, 79 Pages. XP093099960, Sections 7.7.2.3.4 to 7.7.4.4, pp. 33-39.

Partial International Search Report—PCT/US2023/082184—ISA/EPO—Mar. 4, 2024.

* cited by examiner

HANDOVER MANAGEMENT IN A SYNCHRONIZATION SYSTEM

FIELD OF THE DISCLOSURE

The present disclosure generally relates to wireless communications. For example, aspects of the present disclosure relate to handovers in a synchronization system including one or more network devices (e.g., access points (APs)) and one or more wireless communication devices (e.g., peripheral devices, such as electronic shelf labels (ESLs)).

BACKGROUND OF THE DISCLOSURE

Short range wireless communication enables wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz.

BLUETOOTH® Low Energy (BLE) is a form of BLUETOOTH® communication that allows for communication with devices running on low power. Such devices may include beacons, which are wireless communication devices that may use low-energy communication technology for positioning, proximity marketing, or other purposes. In some cases, such devices may serve as nodes (e.g., relay nodes) of a wireless mesh network that communicates and/or relays information to a managing platform or hub associated with the wireless mesh network.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method of wireless communications performed at a network entity is provided, the method comprising: determining a handover candidate, wherein the handover candidate is a wireless communication device of a plurality of wireless communication devices associated with the network entity; transmitting, to each network device of a plurality of network devices, channel information and scheduling information associated with the handover candidate; receiving, from each network device of the plurality of network devices, energy information associated with a pre-determined packet received by each network device of the plurality of network devices; and determining a target network device for a handover associated with the handover candidate based on the received energy information.

In another example, a network entity for wireless communications is provided. The network entity for wireless communications includes at least one memory and at least one processor coupled to the at least one memory and configured to: determine a handover candidate, wherein the handover candidate is a wireless communication device of a plurality of wireless communication devices associated with the network entity; transmit, to each network device of a plurality of network devices, channel information and scheduling information associated with the handover candidate; receive, from each network device of the plurality of network devices, energy information associated with a pre-determined packet received by each network device of the plurality of network devices; and determine a target network device for a handover associated with the handover candidate based on the received energy information.

In another example, a non-transitory computer-readable medium is provided that includes instructions that, when executed by at least one processor, cause the at least one processor to: determine a handover candidate, wherein the handover candidate is a wireless communication device of a plurality of wireless communication devices associated with the network entity; transmit, to each network device of a plurality of network devices, channel information and scheduling information associated with the handover candidate; receive, from each network device of the plurality of network devices, energy information associated with a pre-determined packet received by each network device of the plurality of network devices; and determine a target network device for a handover associated with the handover candidate based on the received energy information.

In another example, an apparatus for wireless communications at a wireless communication device is provided. The apparatus includes: means for determining a handover candidate, wherein the handover candidate is a wireless communication device of a plurality of wireless communication devices associated with the network entity; means for transmitting, to each network device of a plurality of network devices, channel information and scheduling information associated with the handover candidate; means for receiving, from each network device of the plurality of network devices, energy information associated with a pre-determined packet received by each network device of the plurality of network devices; and means for determining a target network device for a handover associated with the handover candidate based on the received energy information.

In another example, a method of wireless communications performed at a wireless communication device for wireless communications is provided, the method comprising: determining one or more handover candidate access points (APs) for handover of the wireless communication device from a serving AP associated with the wireless communication device; determining a respective hopping frequency sequence (HFS) associated with each handover candidate AP of the one or more handover candidate APs; determining energy information associated with each handover candidate AP of the one or more handover candidate APs based on the respective HFS associated with each handover candidate AP; and transmitting, to a selected handover candidate AP of the one or more handover candidate APs, a pre-determined packet associated with the handover of the wireless communication device.

In another example, a wireless communication device for wireless communications is provided. The wireless communication device for wireless communications includes at least one memory and at least one processor coupled to the at least one memory and configured to: determine one or more handover candidate access points (APs) for handover of the wireless communication device from a serving AP associated with the wireless communication device; determine a respective hopping frequency sequence (HFS) associated with each handover candidate AP of the one or more handover candidate APs; determine energy information associated with each handover candidate AP of the one or more handover candidate APs based on the respective HFS associated with each handover candidate AP; and transmit, to a selected handover candidate AP of the one or more handover candidate APs, a pre-determined packet associated with the handover of the wireless communication device.

In another example, a non-transitory computer-readable medium is provided that includes instructions that, when executed by at least one processor, cause the at least one processor to: determine one or more handover candidate access points (APs) for handover of the wireless communication device from a serving AP associated with the wireless communication device; determine a respective hopping frequency sequence (HFS) associated with each handover candidate AP of the one or more handover candidate APs; determine energy information associated with each handover candidate AP of the one or more handover candidate APs based on the respective HFS associated with each handover candidate AP; and transmit, to a selected handover candidate AP of the one or more handover candidate APs, a pre-determined packet associated with the handover of the wireless communication device.

In another example, an apparatus for wireless communications at a wireless communication device is provided. The apparatus includes: means for determining one or more handover candidate access points (APs) for handover of the wireless communication device from a serving AP associated with the wireless communication device; means for determining a respective hopping frequency sequence (HFS) associated with each handover candidate AP of the one or more handover candidate APs; means for determining energy information associated with each handover candidate AP of the one or more handover candidate APs based on the respective HFS associated with each handover candidate AP; and means for transmitting, to a selected handover candidate AP of the one or more handover candidate APs, a pre-determined packet associated with the handover of the wireless communication device.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
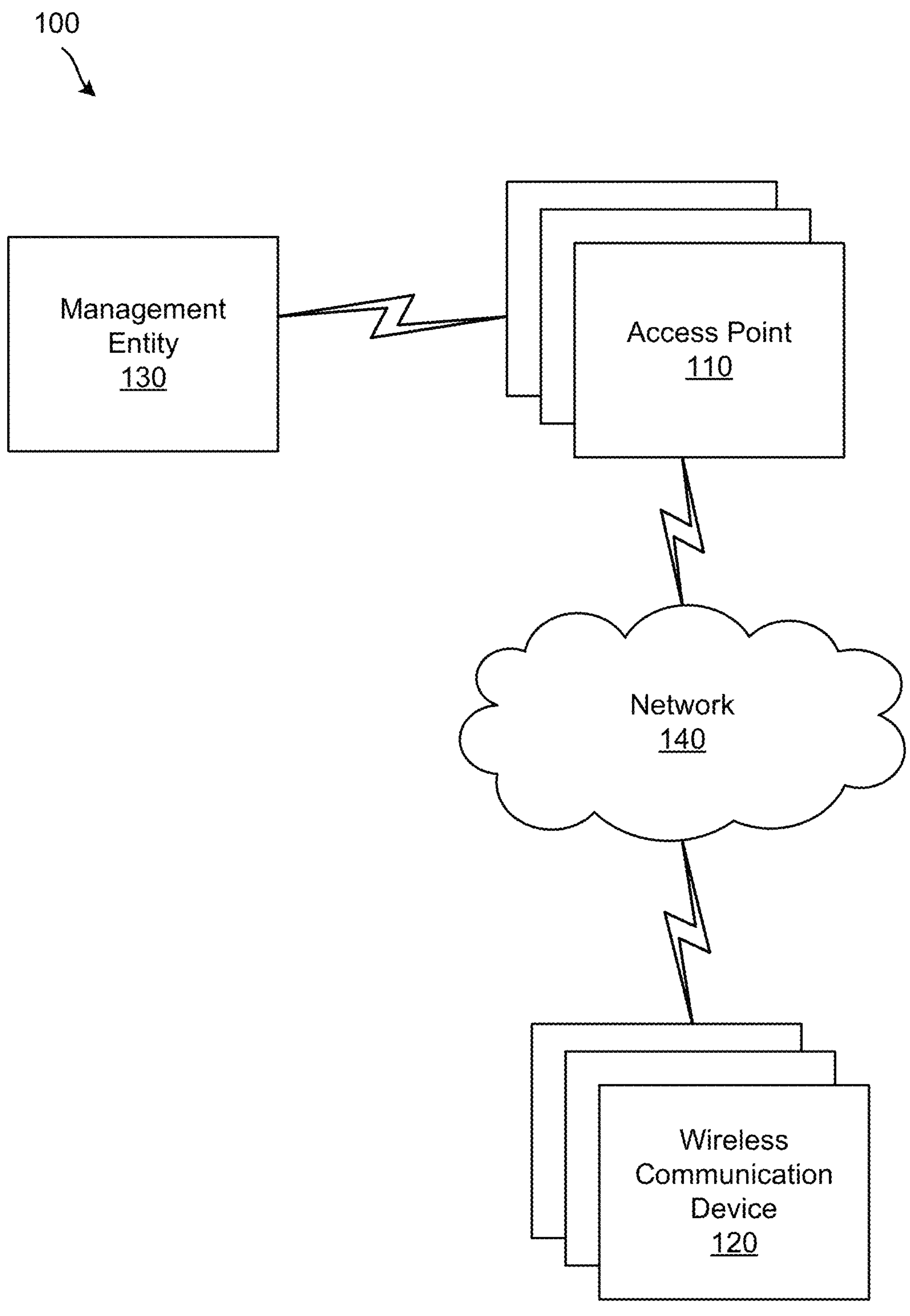
FIG. 1 is a diagram illustrating an example environment in which systems and/or methods described herein may be implemented, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

A system may include one or more wireless communication devices that are controlled by a network entity. For example, a system including multiple peripheral devices (e.g., an electronic shelf label (ESL) system) may include one or more wireless communication devices (e.g., peripheral devices, such as ESLs) that are controlled by a network entity, such as a management entity (ME), via at least one network device, such as an access point (AP). In one or more examples, to facilitate control by the ME, each peripheral device (e.g., ESL) may have a wireless connection (e.g., a BLUETOOTH® Low Energy (BLE) connection or other connection) to AP that is communicatively connected to the ME (e.g., via the Internet, such as wirelessly, via an Ethernet connection, etc.). In some cases, commands from the ME may be wirelessly transmitted to the peripheral devices (e.g., ESLs) by the AP. Responses or information from the peripheral devices may also be received by the AP and provided by the AP to the ME. Each AP may have an associated channel map. A channel map is a listing of frequency channels to be utilized or, conversely, not to be utilized (e.g., in the context of modification of frequency hopping sequences) by an AP for communication, such as with the ESLs or other peripheral devices. While examples are described herein using ESLs as illustrative examples of wireless communication devices, a management entity as an example of a network entity, and access points as examples of network devices, the systems and techniques described herein are applicable to any type of system or network.

In some examples, ESL systems can be deployed to support and manage ESL devices in stores (e.g., supermarkets) and other retail spaces. In some examples, ESL systems may be deployed to support and manage ESL devices in warehouses (e.g., distribution centers) and other industrial spaces. For instance, in a store, ESLs may be provided as electronic labels that are affixed to store shelves to identify the items and the price of the items located on the store shelf above the label. ESLs may be each implemented with a display (e.g., a liquid crystal display (LCD), an electronic paper (e-paper) display, etc.). The ESL may digitally display the name of the item, a product identification number for the item, such as a stock keeping unit (SKU) number, and a price for the item. The ESL may additionally display a barcode for the item, a quick response (QR) code for the item, and/or an image (e.g., a picture) of the item. In some examples, each ESL may include a display and a radio or wireless transceiver for communicating with one or more APs and/or MEs included in the ESL system. For example, during operation of the ESL system, the information displayed on the ESLs may be updated periodically by using periodic advertisements (PAS), as will be described in greater depth below.

In some examples, multiple electronic labels can be associated with or affixed to a same rail. For example, a rail can be the portion of the shelf that faces forward (e.g., faces an aisle, or individual in the aisle, adjacent to the shelf) and upon which the electronic labels are affixed. In some examples, each shelf can include its own rail. In other examples, one rail may be affixed to or associated with multiple adjacent shelves. The electronic labels associated with or affixed to a given rail may be provided as ESLs (e.g., each ESL including its own display and/or including its own wireless transceiver). In some cases, the electronic labels associated with or affixed to a given rail may each include a display, without including a wireless transceiver. For example, the electronic labels can comprise a plurality of rail displays (e.g., electronic ink (e-ink) displays) that do not include a dedicated wireless transceiver.

In some cases, an ESL system can additionally include one or more controllers. For instance, a controller can be implemented using an ESL device (e.g., including a wireless transceiver). An ESL device used as a controller may include a display or may not include a display. For example, each given rail can be associated with a respective controller. Each ESL associated with or affixed to the given rail can be communicatively coupled to the respective controller. A controller can include a radio or other wireless transceiver for communicating with APs and/or MEs that are associated with the same ESL system. A controller can further include a serial interface that provides a wired connection to each ESL of the plurality of ESLs associated with the controller. For example, the ESLs associated with a rail may communicate with APs and/or MEs of the ESL system via the respective controller (e.g., the ESLs can communicate with the controller via the wired serial interface, and the controller can then wirelessly communicate with an AP or ME). In some examples, a battery capacity that may be associated with a controller can be larger than a battery capacity that may be associated with a standalone ESL. For example, a controller may have a battery capacity of 3500 mAh and a standalone ESL may have a battery capacity of 350 mAh.

As noted previously, in some examples, ESL systems can additionally, or alternatively, be used to support and manage ESL devices in warehouses (e.g., distributions) and other industrial spaces. For example, in a warehouse or distribution center, ESL devices can be provided as trackers that are attached to pallets or various other shipping containers that are moved throughout the warehouse and/or transported in a supply chain. In some examples, a tracker can be provided as a printed active (e.g., battery-powered) Bluetooth® Low Energy (BLE) label. A BLE tracker can be implemented based on (e.g., can be compliant with) the ESL protocol. For example, a BLE tracker can be attached to a pallet of merchandise and used to track the pallet of merchandise as it moves from a global distribution center (GDC) to a retail store environment.

In ESL systems, periodic advertisements (PAs) can be utilized to provide regular and predictable payload transmissions from a network device (e.g., such as an AP) to one or more wireless communication devices (e.g., such as ESLs). For example, PAs can be used to issue information from a network device to multiple wireless communication devices, which may be within one or more groups of wireless communication devices. PAs are generally unidirectional (e.g., unidirectional transmissions) such that PAs are transmitted only one-way from a network device (e.g., AP) to one or more wireless communication devices (e.g., ESLs). In some examples, the information displayed on the ESLs may be updated periodically by using periodic advertisements (PAS), as noted previously above.

Periodic Advertisement with Response (PAwR) can be used for ESL systems to provide bidirectionality (e.g., bidirectional transmissions between a central device and one or more peripheral devices). Wireless communication devices (e.g., peripheral devices, such as ESLs) synchronized within a group of wireless communication devices can be addressed by a network device (e.g., AP) on a synchronized channel (e.g., a radio frequency (RF) channel between the network device and the wireless communication devices) whenever the network device chooses to send (e.g., transmit) a request to the wireless communication devices. In some cases, as used herein, a synchronized channel refers to a channel on which transmissions are synchronized (in time). For example, the channel can include a frequency on which one or more communications are transmitted. A hopping frequency sequence can be associated with the channel, where the hopping frequency sequence progresses at a fixed and/or pre-determined interval. A central device (e.g., AP, ME, etc.) and one or more peripheral devices (e.g., ESLs) can concurrently track the hopping frequency sequence at the predefined frequency hopping pattern (e.g., such that the central device knows when to transmit the request and the peripheral devices know when to listen for and/or receive the request).

In some cases, a request transmitted by a central device to peripheral devices in a particular group may be a PA containing a synchronization message transmitted by the central device on the synchronized channel to the peripheral devices of the particular group. For example, wireless communication devices (e.g., ESLs) within the particular group can wake up (e.g., from a powered off or shut-down state) at the same PA transmission with respect to a particular PAwR train for that group. A PA transmission can include a periodic set of transmissions, which may be collectively referred to as a PA train, or a PAwR train when applied to PAwR. Each transmission of a PA train (or PAwR train) occurs at a precise point in time, with fixed intervals between the transmissions. A communication channel (e.g., one communication channel out of thirty-seven available communication channels) is selected for each of the transmissions, where the communication channel follows a hopping frequency sequence.

The synchronization between the central device and the peripheral devices in the group can be based on the periodicity of the PA. The periodically-transmitted messages (e.g., the synchronization messages) can include zero, one, or more commands (e.g., a respective operational code (OpCode) and parameters associated with each command). If a response from a wireless communication device is expected by the network device (e.g., the synchronization message from the network device requests a response from a specific wireless communication device), the particular wireless communication device can respond in a specific response slot, which may be based on where the wireless communication device appeared within a sequence contained within the synchronization message transmitted by the network device.

In some cases, one or more ESLs may be physically moved to a new location. For example, one or more ESLs may be moved from one location in a retail store (e.g., a particular shelf or a storage area) to a different location in the retail store, to a different retail store location, etc. In some examples, store shelves (e.g., with a plurality of ESLs attached thereto) may be attached to a gondola that allows the moving or repositioning the shelves and the products provided on the shelves. In another example, an ESL that is provided as a tracker (e.g., such as a printed active BLE label) may by physically moved during transportation of a pallet (e.g., to which the tracker is attached) from a distribution center to a retail store location.

Changing the location of an ESL may result in the ESL losing synchronization with (e.g., due to being out of range) a current AP and/or ME with which the ESL is associated with for wireless communications. Such a loss in synchronization may interrupt the ME's ability to control the ESL and the ESL's ability to report to the ME. In some examples, after determining a network outage (e.g., caused by the loss of synchronization), an ESL may perform an onboarding procedure to reestablish synchronization with an AP. To perform the onboarding procedure, the ESL may transmit advertisement messages, receive a connection request from an in-range AP that detected the advertisement messages, and exchange messages with the AP (e.g., including the exchange of periodic advertisement synchronization transfer (PAST) information). The onboarding procedure may consume significant computing resources (e.g., processor resources, memory resources, and/or battery resources, among other examples) of the ESL and/or the AP, and frequent advertisement by one or more ESLs may result in spectral pollution on advertisement channels of the wireless network.

Currently, access point synchronization (e.g., described below with respect to FIG. 4) can enable discovery and synchronization of communication timings of multiple APs within an ESL system. For example, periodic advertisement (PA) timings used by the multiple APs may be synchronized. In AP synchronization, an ESL can have access to multiple APs. When an ESL is moved from one location to another location such that the ESL is out of range of its current associated AP, the ESL can identify an alternative AP that is within range of the ESL to associate with and jump on a periodic advertisement with multiple responses (PAwMR) train associated with that AP. However, in a typical environment (e.g., a large retail store, a warehouse, etc.), APs may be positioned in various different locations around the environment. In some cases, an ESL that has access to multiple APs may have access to a hopping frequency sequence (HFS) of each of the APs and/or may be able to derive the HFS of each AP from information stored by the ESL (e.g., information communicated to the ESL during on-boarding of the ESL with an AP In some cases, changing the location of an ESL can cause a handover of the ESL from a first AP to a second AP (e.g., wherein the first AP is associated with or communicates with the ESL in a first location and the second AP is associated with or communicates with the ESL in a different, second location). If the location of an ESL changes and a handover is not performed, the ESL may lose synchronization with the first AP (e.g., may become unsynchronized with the first AP). For example, an ESL may be considered unsynchronized based on the ESL failing to receive six consecutive PAs from the AP (e.g., six consecutive AP Sync packets). As mentioned above, an ESL may be triggered to wake up (e.g., exit a low power (LP) mode) to perform handover from a first AP to a second AP and to establish synchronization with the second AP. An ESL may also be triggered to wake up or exit the LP mode when the ESL is in an unsynchronized state (e.g., based on the ESL transmitting advertisement messages and/or performing the onboarding procedure to re-establish synchronization with an AP). There is a need for systems and techniques that can be used to perform handover of an ESL device while maintaining synchronization. There is a further need for systems and techniques that can be used to perform synchronization of an ESL device to an AP without waking the ESL device from low power mode. For example, there is a need to transfer synchronization of an already synchronized ESL device to an AP to which it is unsynchronized, without waking the ESL device from low power mode.

Systems and techniques are described herein that can be used to perform handover of a wireless communication device (e.g., such as an electronic shelf label (ESL) device) without utilizing primary channel measurements. For example, the systems and techniques can be used to perform handover of an ESL device such as a controller or an active BLE tracker (e.g., among various other ESL devices) in an access point (AP) synchronization system. In some cases, an AP synchronization system can be provided as an ESL system.

In some examples, the systems and techniques can be used to perform handover of an ESL device (e.g., controller, active BLE tracker, etc.) without performing multiple connection establishment and/or single connection establishment with multiple candidate APs for the handover. For example, an AP can perform handover based on receiving a pre-determined packet transmitted by an ESL device. In some examples, an AP can perform handover based on receiving an auxiliary synchronization indication (referred to herein as an "AUX_SYNC_IND" packet) transmitted by an ESL device. In some examples, the auxiliary synchronization indication transmitted by the ESL device can be an AUX_SYNC_SUBEVENT_RSP PDU. In some cases, the systems and techniques can be used such that an ESL device can wake up (e.g., exit a low power (LP) mode) in a frame that is out of turn. For example, the ESL device can wake up in an out of turn frame, on a group to which the ESL device is not allocated. In some cases, an ESL device can wake up in an out of turn frame (e.g., on a group to which the ESL device is not allocated) and may additionally perform a periodic wake up in a frame on a group to which the ESL device is allocated.

In some examples, an ESL device can use the systems and techniques to scan for a pre-determined packet (e.g., an AUX_SYNC_IND packet) from an AP to whose PA the ESL device is not synchronized. In some cases, an ESL device can scan for an AUX_SYNC_IND packet from an AP to whose PA the ESL device is not synchronized to and may additionally scan for an AUX_SYNC_IND packet from an AP to whose PA the ESL device is synchronized to.

In some examples, the systems and techniques can utilize an unsolicited pre-determined packet received from an ESL device (e.g., an unsolicited AUX_SYNC_IND packet transmitted by an ESL device). For example, an ESL device can transmit an unsolicited AUX_SYNC_IND packet in response to an APs PA to which the ESL device is not synchronized to. Based on the unsolicited AUX_SYNC_IND packet, a fast connection (e.g., handover) between the ESL device and the AP to which the ESL device is not synchronized can be performed without using legacy connection establishment procedures (e.g., which would have the ESL device transmit a CON_ADV to be received by a candidate AP over a legacy channel). For example, a fast connection or handover between the ESL device and the AP to which the ESL device is not synchronized can be performed based on a fixed group and/or access slot. In some cases, the fast connection or handover can be performed using a dynamic group and/or access slot that is based on a load associated with the AP (e.g., determined by a management entity (ME)).

In another example, handover decision making can be implemented by the ESL device. For example, a rail controller or active BLE tracker can perform handover decision making based on determining one or more issues (or potential issues) associated with the currently serving AP of the rail controller or active BLE tracker. Based on determining the one or more issues or potential issues with the currently serving AP, the rail controller or active BLE tracker can perform discovery of potential candidate APs for handover. For example, the rail controller or active BLE tracker can determine an AUX_SYNC_IND hopping frequency sequence (HFS), which can include a set of indices that the rail controller or active BLE tracker may use to predict the channel used by any available AP in a frame. In some cases, the AUX_SYNC_IND HFS can be determined based on an onboarding payload received from the management entity (ME). For example, for each handover candidate AP, the ESL device (e.g., rail controller or active BLE tracker) can receive an onboarding payload that includes a channel map information, an access address information, and an event counter information.

Based on the HFS included in the onboarding payload(s), the ESL device can begin scanning at a pre-determined rate on the various handover candidate APs. For example, each scan can be associated with a respective handover candidate AP of a plurality of handover candidate APs. In some cases, the ESL device can determine energy information associated with each data channel of up to 37 data channels. In some examples, the energy information determined by the ESL device can be Received Signal Strength Indicator (RSSI) information. The handover candidate APs can be ordered based on an order of preference and/or can be ordered based on a handover algorithm to determine one or more handover candidate APs for selection by the ESL device.

Additional aspects of the present disclosure are described with reference to the figures.

FIG. 1 is a diagram of an example environment 100 in which systems and/or methods described herein may be implemented. As shown in FIG. 1, the environment 100 may include at least one access point (AP) 110, at least one wireless communication device 120, a management entity (ME) 130, and a network 140. Devices of the environment 100 may interconnect via wired connections, wireless connections, or a combination of wired and wireless connections.

The access point 110 may include one or more devices capable receiving, generating, storing, processing, providing, and/or routing information associated with access point synchronization and/or handover, as described elsewhere herein. The access point 110 may include a communication device and/or a computing device. The access point 110 may be configured to transmit beacons (e.g., BLE beacons), as well as to scan and locate other devices (e.g., other devices communicating using BLE protocols).

The wireless communication device 120 may include one or more devices capable of receiving, generating, storing, processing, and/or providing information associated with access point synchronization and/or handover, as described elsewhere herein. The wireless communication device 120 may include a communication device and/or a computing device. In some aspects, the wireless communication device 120 may be, may include, or may be included in an electronic shelf label (ESL).

The management entity 130 includes one or more devices capable of receiving, generating, storing, processing, providing, and/or routing information associated with access point synchronization and/or handover, as described elsewhere herein. The management entity 130 may include a communication device and/or a computing device. For example, the management entity 130 may include a server, such as an application server, a client server, a web server, a database server, a host server, a proxy server, a virtual server (e.g., executing on computing hardware), or a server in a cloud computing system. In some aspects, the management entity 130 includes computing hardware used in a cloud computing environment. The management entity 130 may provide control of a system (e.g., an ESL system) that includes the access point(s) 110, the wireless communication device(s) 120, and/or the device(s) 130. The access point(s) 110 may be communicatively connected to the management entity 130 via a network (not shown), such as the Internet.

The network 140 may include one or more wireless networks. For example, the network 140 may include a personal area network (e.g., a Bluetooth network). The network 140 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
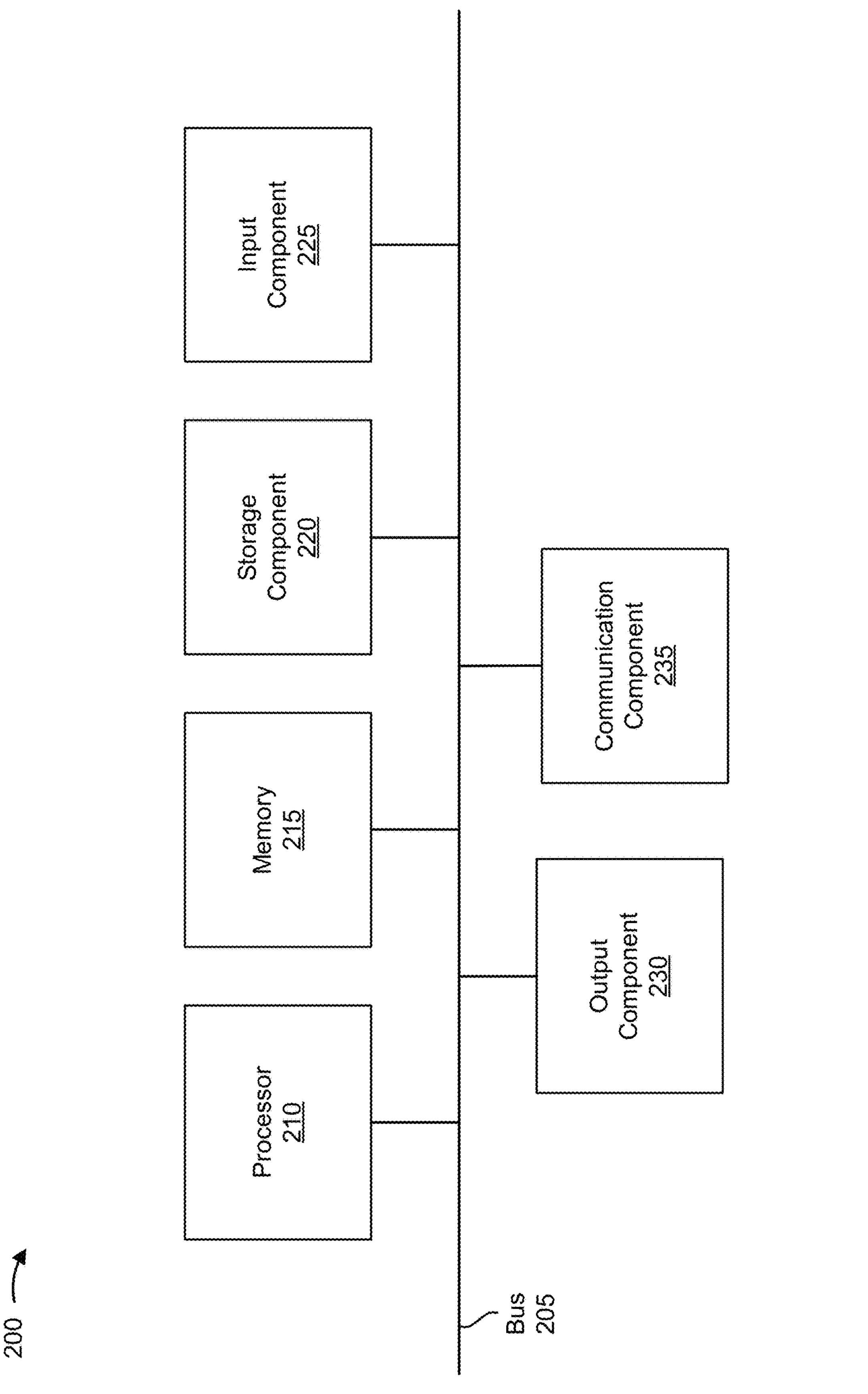
FIG. 2 is a diagram illustrating example components of a device, in accordance with some examples.

FIG. 2 is a diagram illustrating example components of a device 200, in accordance with the present disclosure. Device 200 may correspond to access point 110, wireless communication device 120, and/or management entity 130. In some aspects, access point 110, wireless communication device 120, and/or management entity 130 may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
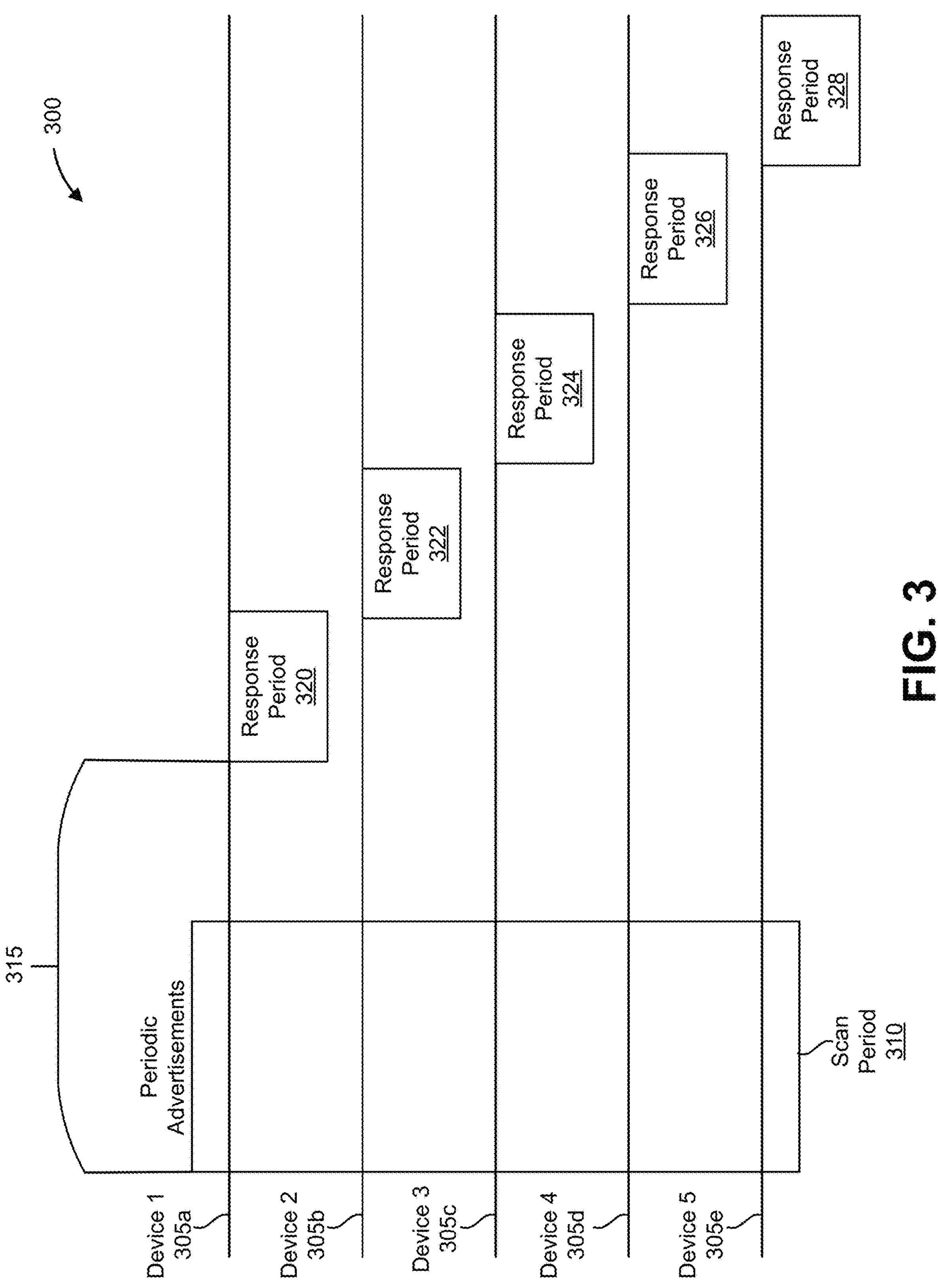
FIG. 3 is a signaling diagram illustrating example communication transmissions, in accordance with some examples.

FIG. 3 is a signal timing diagram illustrating a portion of a communication between an access point (e.g., access point 110) and wireless communication devices 120 (e.g., ESLs). With reference to FIG. 1, the signal sequence illustrated in FIG. 3 may be implemented by one or more of the communication connections, access points 110, and/or wireless communication devices 120 of FIG. 1.

The devices (e.g., device 1 305*a*, device 2 305*b*, device 3 305*c*, device 4 305*d*, and device 5 305*e*) of FIG. 3 may be selected from wireless communication devices 120 of FIG. 1, and may each receive a periodic advertisement (PA) in a scan period 310. The scan period 310 may occur in regularly scheduled intervals and may be repeated periodically such that the devices (e.g., device 1 305*a*, device 2 305*b*, device 3 305*c*, device 4 305*d*, and device 5 305*e*) can awaken to scan for messages during this repeated scan period 310. An access point (e.g., access point 110 of FIG. 1) may provide periodic advertisements (PAs) via broadcast or multi-cast to the devices (e.g., device 1 305*a*, device 2 305*b*, device 3 305*c*, device 4 305*d*, and device 5 305*e*) in the scan period 310. For an access point (e.g., access point 110 of FIG. 1), the scan period 310 can be its primary transmission period. In some cases, the scan period 310 may not be a fixed time because the access point (e.g., access point 110 of FIG. 1) may send different lengths of data from the start of the scan period 310.

The transmission may include multiple advertisements in a train. One or more portions of the advertisements may be directed to one or more of the devices (e.g., device 1 305*a*, device 2 305*b*, device 3 305*c*, device 4 305*d*, and device 5 305*e*). The devices (e.g., device 1 305*a*, device 2 305*b*, device 3 305*c*, device 4 305*d*, and device 5 305*e*) may decode or filter the messages intended for each specific device and transmitted during the period when all devices are receiving. In this way, the devices (e.g., device 1 305*a*, device 2 305*b*, device 3 305*c*, device 4 305*d*, and device 5 305*e*) may be reprogrammed, updated, and/or sent requests from an access point (e.g., access point 110 of FIG. 1) or relayed from another device (e.g., management entity 130 of FIG. 1) through the access point (e.g., access point 110 of FIG. 1). The periodic advertisement (PA) from the access point (e.g., access point 110 of FIG. 1) may set a response period for one or more of the devices (e.g., device 1 305*a*, device 2 305*b*, device 3 305*c*, device 4 305*d*, and device 5 305*e*).

As illustrated, the devices (e.g., device 1 305*a*, device 2 305*b*, device 3 305*c*, device 4 305*d*, and device 5 305*e*) are each assigned a response period 320, 322, 324, 326, 328 in the time after the scan period 310. The first response period 320 may begin following an idle time 315 after the scan period 310, with the idle period being long enough to provide the transmitter device an opportunity to do other Bluetooth related activities. The assigned response periods may also be limited to or designate a particular frequency of the channels on which to respond. For example, in FIG. 3, device 1 305*a* is assigned response period 320, device 2 305*b* is assigned response period 322, device 3 305*c* is assigned response period 324, device 4 305*d* is assigned response period 326, and device 5 305*e* is assigned response period 328. The access point (e.g., access point 110 of FIG. 1) may store attributes of the devices (e.g., device 1 305*a*, device 2 305*b*, device 3 305*c*, device 4 305*d*, and device 5 305*e*), including whether a device is able to transmit or respond. The PA signaling followed by responses can be referred to as periodic advertisement with multiple responses (PAwMR).

For example, device 3 305*c* (e.g., wireless communication device 120 of FIG. 1) may be an ESL and may receive a price update in a PA from the access point (e.g., access point 110 of FIG. 1) in scan period 310. The PA received at device 3 305*c* may include a designated start time for the response period 324 or may include a schedule of response start times for devices including device 3 305*c*. The response by device 3 305*c* to the access point (e.g., access point 110 of FIG. 1) may include an acknowledgement, a status code, and/or other information such as battery life, received signal strength, and/or an error notification. The response by device 3 305*c* may include information to be relayed to another device by the access point (e.g., access point 110 of FIG. 1). The response may include a packet with a header and may conform to any of the Bluetooth protocols. A response may be transmitted in a data channel of the Bluetooth protocol to the access point (e.g., access point 110 of FIG. 1). Both the PA and the responses from all of the devices (e.g., device 1 305*a*, device 2 305*b*, device 3 305*c*, device 4 305*d*, and device 5 305*e*) may use channels of the Bluetooth protocol.

A device (e.g., device 5 305*e*) that has been assigned a response period may not respond and may determine that it has nothing to signal. For example, the devices (e.g., device 1 305*a*, device 2 305*b*, device 3 305*c*, device 4 305*d*, and device 5 305*e*) may determine what response, if any, is required and may or may not respond to a request sent from the access point (e.g., access point 110 of FIG. 1). The response periods 320, 322, 324, 326, 328 may be assigned based on a request for such a period in an open transmission time, the request being sent to the access point (e.g., access point 110 of FIG. 1). The response periods 320, 322, 324, 326, 328 may be assigned based on which devices have been requested by the access point (e.g., access point 110 of FIG. 1) to send data or acknowledgements. The PA messages and responses may be frequency-hopped, time synchronized channels, and/or extended channels of the advertising channels in Bluetooth.

Figure 4:
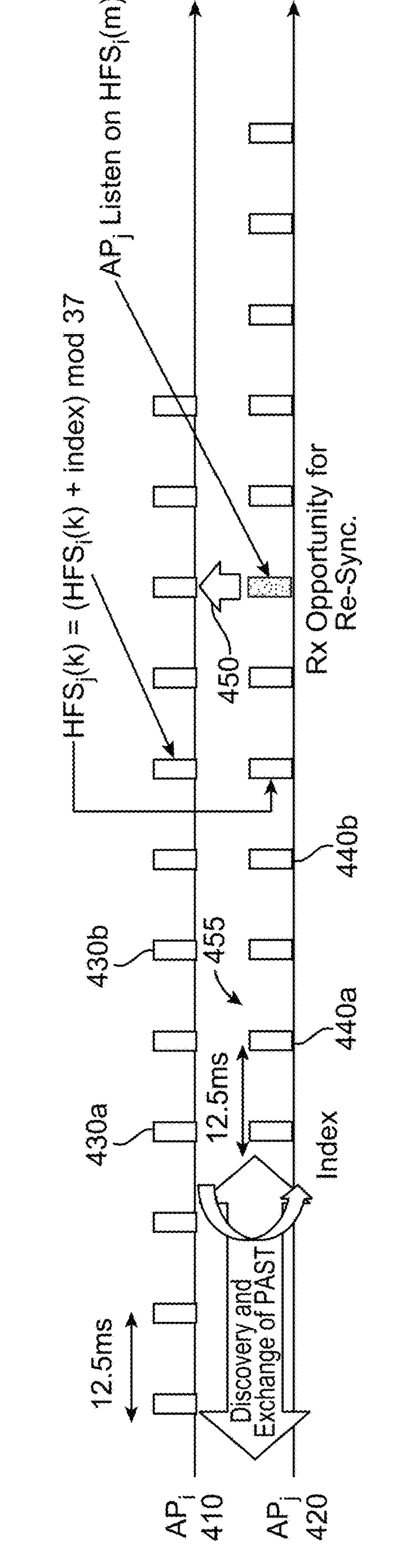
FIG. 4 is a diagram illustrating an example associated with discovery and synchronization between access points, in accordance with some examples.

FIG. 4 is a diagram illustrating an example of transmission timelines 400 associated with discovery and synchronization between access points (e.g., access points 110 of FIG. 1). As shown, example 300 includes access points (e.g., access points 110 of FIG. 1), shown as $AP_i$ 410 and $AP_j$ 420 on the transmission timelines 400. The access points $AP_i$ 410 and $AP_j$ 420 may be communicatively connected to a management entity (e.g., management entity 130 of FIG. 1). In some aspects, the access points and/or the management entity may be included in a wireless communication system, such as an ESL system. The wireless communication system may use a wireless communication technology, such as BLE.

As used herein, "transmission timing" or "periodic advertisement timing" may refer to a timing or schedule by which a device (e.g., an access point) transmits communications or periodic advertisements. For example, two devices that use (e.g., that are synchronized to) the same periodic advertisement timing may transmit periodic advertisements concurrently.

In one or more examples, during operation, a first access point AP1 (e.g., $AP_i$ 410) may transmit (e.g., broadcast) periodic advertisements (e.g., PAs 430*a*, 430*b*), such as a train of periodic advertisements. The periodic advertisements may be unidirectional broadcast messages. The first access point AP1 may transmit periodic advertisements in accordance with a PAwMR schedule. Moreover, the first access point AP1 may transmit the periodic advertisements using a first hopping frequency sequence (HFS). The first HFS may be an HFS configured for the first access point AP1 (e.g., if the first access point AP1 is not a follower of another access point), or the first HFS may be different from a reference HFS based at least in part on a first index value associated with (e.g., selected by) the first access point AP1.

A second access point AP2 (e.g., $AP_j$ 420) may detect at least one periodic advertisement broadcast from the first access point AP1 (e.g., by scanning known channels on which the first access point AP1 performs transmissions and/or by scanning, or taking a snapshot of, an entire band). That is, the second access point AP2 may discover the first access point AP1. In some aspects, the second access point AP2 may listen on one or more advertisement channels (e.g., legacy advertisement channels) to detect information that enables the second access point AP2 to follow and synchronize with the first access point AP1, thereby enabling the second access point AP2 to monitor for the periodic advertisement(s) (e.g., PAs 430*a*, 430*b*). In some aspects, the second access point AP2 may monitor for (e.g., listen for) and detect the periodic advertisement(s) prior to initiation of periodic advertisement transmissions by the second access point AP2 (which may be referred to as a "detect before proceed" policy). For example, in a boot sequence during starting (or re-starting) of the second access point AP2, the second access point AP2 may listen for periodic advertisements from other access points before starting periodic advertisement transmissions. In some aspects, access points (e.g., isolated access points), such as the second access point AP2, may periodically listen for periodic advertisements from neighboring access points.

Based on detecting a periodic advertisement from the first access point AP1, the second access point AP2 may transmit, and the first access point AP1 may receive, a message (e.g., an unsolicited message) to initiate a connection between the first access point AP1 and the second access point AP2. Following the connection, or as part of the connection procedure, the first access point AP1 may transmit, and the second access point AP2 may receive, a synchronization message. The synchronization message may identify the periodic advertisement timing (e.g., the PAwMR schedule) used by the first access point AP1. For example, the synchronization message may include PAST information that indicates the periodic advertising timing used by the first access point AP1 (e.g., by indicating a time offset used by the first access point AP1). In some cases, the PAST information may also include the values of all of the parameters required for HFS computation as well as the channel map. In addition, or alternatively, the synchronization message may identify the first HFS used by the first access point AP1. For example, the PAST information may also indicate a reference HFS used by the first access point AP1, and the first HFS may be the reference HFS or an HFS that is shifted (e.g., frequency shuffled) from the reference HFS. For example, if an HFS is shifted from a reference HFS, then at all frequency instances in a frequency sequence, a channel index of the HFS may be different from a channel index of the reference HFS. In some aspects, the synchronization message may identify the first HFS used by the first access point AP1 by indicating the first index value associated with the first access point AP1 (e.g., the first HFS may be determined using the first index value and the reference HFS). For example, the synchronization message may indicate a set of index values that includes the first index value and/or one or more additional index values, associated with additional access points, known to the first access point AP1. In some aspects, the set of index values may include an index value for the second access point AP2 that indicates an HFS to be used by the second access point AP2.

The exchange of periodic advertising timing information (e.g., the exchange of PAST information) may enable the second access point AP2 to synchronize with the first access point AP1. Accordingly, in the same manner, multiple additional access points may synchronize to the same periodic advertisement timing. For example, a third access point AP3 may also synchronize with the first access point AP1, and a fourth access point AP4 may synchronize with the third access point AP3, thereby resulting in the fourth access point AP4 being synchronized with the second access point AP2 by transitive synchronization. In this way, multiple access points may become time synchronized with each other.

As shown by reference number 455, based on receiving the synchronization message, the second access point AP2 may transmit periodic advertisements (e.g., PAs 440*a*, 440*b*), such as transmissions on a data channel, synchronized with the periodic advertisement timing (e.g., the PAwMR schedule) used by the first access point AP1. In this way, periodic advertisements are transmitted concurrently by the first access point AP1 and the second access point AP2. However, the second access point AP2 may transmit the periodic advertisements according to a second HFS. The second HFS may be offset from (e.g., different from) the first HFS used by the first access point AP1 or a reference HFS. In other words, each of the access points (e.g., with physically overlapping coverage areas) may use an HFS that is different from an HFS of any of the other access points. By using different HFSs, interference among the access points may be avoided despite the access points being time synchronized. As such, for any two HFSs of different APs, the probability of selecting the same channel at the same instant of time should be low.

The second HFS may be based at least in part on a second index value (e.g., different from the first index value) associated with the second access point AP2. For example, each of the access points (e.g., with physically overlapping coverage areas) may be associated with a different index value from any of the other access points. Accordingly, based at least in part on the set of index values identified to the second access point AP2, the second access point AP2 may select the second index value to achieve an HFS (e.g., in a radio frequency range of the second access point AP2) that is orthogonal to every other HFS currently in use. In some aspects, the second HFS may be shifted relative to the first HFS or the reference HFS based at least in part on the second index value. For example, the second HFS may be determined according to Equation 1 below:

$$HFS_i = (HFS_0 + \text{index}_i) \bmod 37 \quad \text{Equation 1}$$

where $HFS_0$ is the reference HFS, $HFS_i$ is the HFS being determined, and $\text{index}_i$ is the index value used to determine the HFS. Equation 1 uses a value of 37 for the modulo operation because a BLE system uses 37 data channels. However, a different value for the modulo operation may be used (e.g., corresponding to a quantity of channels) in other systems.

In some aspects, an index value may indicate an HFS in a manner other than as described above. That is, an index value may be any means to identify a hopping frequency channel (or "channel selection") sequence. For example, each access point and each wireless communication device may be configured with a set of HFSs, and an index value may map to a particular HFS of the set of HFSs. Thus, indication of a set of index values, as described herein, may refer to the indication of all active (e.g., in use) HFSs of the set of HFSs.

In some aspects, the first access point AP1 may transmit, and one or more wireless communication devices (e.g., wireless communication devices 120 of FIG. 1) may receive, information identifying the periodic advertisement timing (e.g., PAST information) used by the first access point AP1. For example, the first access point AP1 may transmit the information in connection with onboarding the wireless communication device(s) to the first access point AP1. In some aspects, the second access point AP2 may transmit, and one or more wireless communication devices (e.g., wireless communication devices 120) may receive, information identifying the periodic advertisement timing (e.g., PAST information) used by the second access point AP2. For example, the second access point AP2 may transmit the information to wireless communication devices already onboarded with the second access point AP2, or the second access point AP2 may cause the wireless communication devices to repeat an onboarding procedure with the second access point AP2 during which the information is transmitted.

In some aspects, the first access point AP1 may transmit (e.g., via broadcast), and one or more wireless communication devices (e.g., wireless communication devices 120 of FIG. 1) synchronized to the first access point AP1 may receive, information identifying a set of (e.g., one or more) index values indicating HFSs used by one or more access points. For example, the set of index values may include the first index value associated with the first access point AP1, the second index value associated with the second access point AP2, and/or one or more additional index values, associated with additional access points, known to the first access point AP1. Similarly, in some aspects, the second access point AP2 may transmit (e.g., via broadcast), and one or more wireless communication devices (e.g., wireless communication devices 120 of FIG. 1) synchronized to the second access point AP2 may receive, information identifying a set of (e.g., one or more) index values indicating HFSs used by one or more access points. For example, the one or more index values may include the first index value associated with the first access point AP1, the second index value associated with the second access point AP2, and/or one or more additional index values, associated with additional access points, known to the second access point AP2. In some aspects, the first access point AP1 and/or the first access point AP1 may receive, from the management entity, information indicating the index values that are in use (e.g., valid indexes) for one or more additional access points.

Over time (e.g., due to clock drift), the periodic advertisement timing used by the first access point AP1 and the second access point AP2 may become misaligned. As shown by reference number 450, the second access point AP2 may monitor (e.g., sporadically) for an additional periodic advertisement from the first access point AP1 in a monitoring opportunity. In other words, the second access point AP2 may sacrifice a periodic advertisement transmission (e.g., for a particular group of wireless communication devices) in order to monitor (e.g., listen) for the additional periodic advertisement from the first access point AP1. In some aspects, the monitoring opportunity, in which the second access point AP2 monitors for the additional periodic advertisement, may be based at least in part on an expected clock drift between the first access point AP1 and the second access point AP2. Based on a timing of the additional periodic advertisement, the periodic advertisement timing may be realigned between the first access point AP1 and the second access point AP2. For example, the second access point AP2 may realign with the periodic advertisement timing used by the first access point AP1 based at least in part on a timing of the additional periodic advertisement (e.g., based at least in part on a difference between the actual timing of the additional periodic advertisement and an expected timing of the additional periodic advertisement).

In some examples, an access point that uses a transmission timing or schedule (e.g., a periodic advertisement timing or schedule) that is followed by another access point may be referred to as a "leader access point," and an access point that synchronizes its transmission timing or schedule to the transmission timing or schedule of another access point may be referred to as a "follower access point." In some cases, an access point may be both a leader access point and a follower access point. For example, the transmission timing or schedule used by a first access point may be followed by a second access point, and a third access point may follow the transmission timing or schedule used by the second access point. Thus, in this example, the second access point is both a leader access point and a follower access point.

As indicated above, FIG. 4 is provided as an example. Other examples may differ from what is described with respect to FIG. 4.

In some examples of access point (AP) synchronization (e.g., such as those described above with respect to FIG. 4), when an ESL is moved from one location to another in an environment such that the ESL is out of range of its current associated AP, the ESL may identify an alternative AP within range of the ESL to associate with. In some cases, the ESL may be able to join the PAwMR train associated with the identified AP relatively quickly. In some examples, such as in a large retail store environment with multiple APs, handover of an ESL device (e.g., a rail controller, an active BLE tracker, etc.) from a first AP to a second AP may be slowed or prevented based on the handover being performed based on measurements on a primary channel (e.g., also referred to as a legacy channel). For example, the primary channel may be crowded with various other wireless transmissions (e.g., non-ESL beacons) that may interfere with the ability of APs and ESL devices to perform handover operations. In some examples, it may additionally be difficult for an ESL device to perform multiple, simultaneous Received Signal Strength Indicator (RSSI) measurements for multiple APs. For example, when the data channel between the ESL device and the multiple APs experiences channel contention, it can be difficult to perform simultaneous RSSI measurements. In some cases, the RSSI measurements for multiple APs may experience lag or delay, such that the RSSI measurements are unable to be performed simultaneously. In other examples, a prolonged or extended handover between an ESL device from a current AP associated with the ESL device to an identified AP selected from a plurality of handover candidate APs may be associated with increased power consumption. The increased power consumption can consume a relatively large percentage of the available battery power at the ESL device, for example while the ESL device must remain awake (e.g., not in a low power (LP) mode) during measurement, handover decision making, and/or synchronization operations. In some examples, handover of an ESL device from the current AP to the identified AP selected from a plurality of handover candidate APs may be performed based on multiple connection establishment, wherein a new connection request is sent by the ESL device to the identified AP after the handover decision has been made (e.g., after the handover decision has been made by the management entity (ME)).

As noted previously, the systems and techniques described herein can be used to perform handover of a wireless communication device (e.g., such as an electronic shelf label (ESL) device) without utilizing primary channel measurements. For example, the systems and techniques can be used to perform handover of an ESL device such as a rail controller or an active BLE tracker (e.g., among various other ESL devices) in an access point (AP) synchronization system. In some cases, an AP synchronization system can be provided as an ESL system. In some examples, the systems and techniques can be used to perform handover of an ESL device (e.g., rail controller, active BLE tracker, etc.) without performing multiple connection establishment with multiple candidate APs for the handover. For example, an AP can perform handover based on receiving a pre-determined packet transmitted by an ESL device. In some examples, an AP can perform handover based on receiving an AUX_SYNC_IND packet transmitted by an ESL device. In some cases, the systems and techniques can be used such that an ESL device can wake up (e.g., exit a low power (LP) mode) in a frame that is out of turn. For example, the ESL device can wake up in an out of turn frame, on a group to which the ESL device is not allocated. In some cases, an ESL device can wake up in an out of turn frame (e.g., on a group to which the ESL device is not allocated) and may additionally perform a periodic wake up in a frame on a group to which the ESL device is allocated.

In some examples, an ESL device can use the systems and techniques to scan for a pre-determined packet (e.g., an AUX_SYNC_IND packet) from an AP to whose PA the ESL device is not synchronized. In some cases, an ESL device can scan for an AUX_SYNC_IND packet from an AP to whose PA the ESL device is not synchronized to and may additionally scan for an AUX_SYNC_IND packet from an AP to whose PA the ESL device is synchronized to. In some examples, the systems and techniques can utilize an unsolicited pre-determined packet (e.g., an unsolicited AUX_SYNC_IND packet). For example, an ESL device can transmit an unsolicited AUX_SYNC_IND packet in response to an APs PA to which the ESL device is not synchronized to. Based on the unsolicited AUX_SYNC_IND packet, a fast connection (e.g., handover) between the ESL device and the AP to which the ESL device is not synchronized can be performed without using conventional connection establishment procedures. For example, a fast connection or handover between the ESL device and the AP to which the ESL device is not synchronized can be performed based on a fixed group and/or access slot. In some cases, the fast connection or handover can be performed using a dynamic group and/or access slot that is based on a load associated with the AP (e.g., determined by a management entity (ME)), as will be described in greater depth below.

Figure 5:
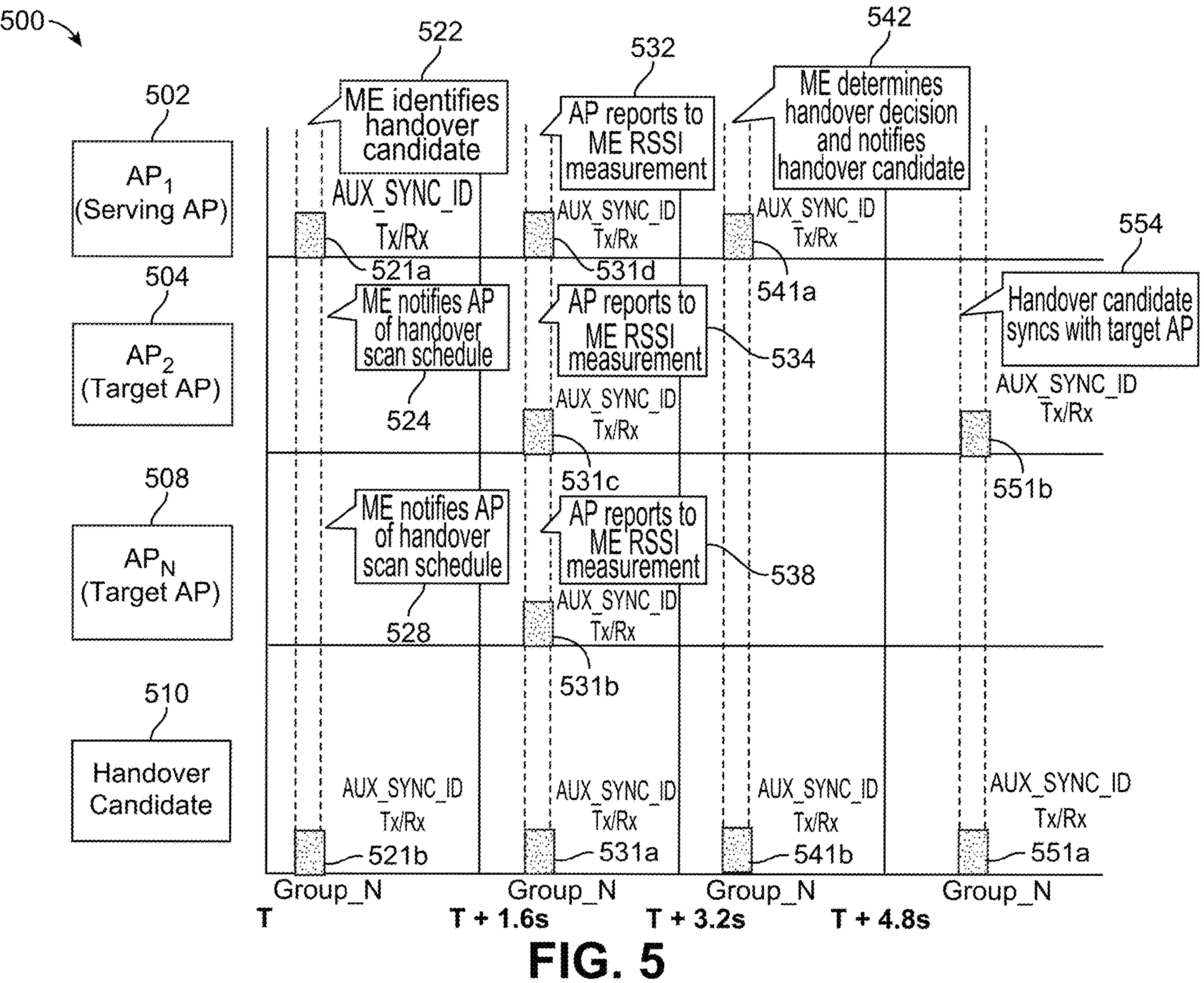
FIG. 5 is a signaling diagram illustrating an example handover based on pre-determined packet, in accordance with some examples.

FIG. 5 is a signaling diagram illustrating an example handover 500 of an ESL device (e.g., rail controller, active BLE tracker, etc.) from a first AP to a second AP. The example handover 500 can be performed in an ESL system. In one illustrative example, the ESL device handover 500 can be performed based on a pre-determined packet, such as an AUX_SYNC_IND packet. In some aspects, the ESL device handover 500 can be performed based on a handover decision determined at an AP and/or ME included in the ESL system.

For example, an ESL system can include a first AP 502 (e.g., depicted as $AP_1$ and also referred to as a "serving AP"), a second AP 504 (e.g., depicted as $AP_2$), and one or more additional APs (e.g., depicted as APN). In some cases, the second $AP_2$ 504 and the additional APN 508 can each be referred to as a "target AP." In one illustrative example, the plurality of APs included in the ESL system (e.g., $AP_1$ 502, $AP_2$ 504, additional APN(s) 508) can be synchronized with one another. For example, the ESL system including the plurality of APs can be a fully synchronized network.

The ESL system associated with the example handover 500 can additionally include a handover candidate 510. The handover candidate 510 can be an ESL device identified as in need of handover and/or can be an ESL device for which a handover operation has been triggered or will be performed. For example, the handover candidate 510 can be a rail controller that has moved locations and is need of handover from a currently serving AP (e.g., the serving $AP_1$ 502 that was most recently associated with or serving handover candidate 510) to one of the target APs 504, 508. In other examples, the handover candidate 510 can be an active BLE tracker that has moved locations and is need of handover from a currently serving AP (e.g., the serving $AP_1$ 502) to one of the target APs 504, 508.

In one illustrative example, the handover candidate 510 can be identified or determined by a management entity (ME) associated with the ESL system. For example, as depicted in FIG. 5, at block 522 the ME can identify the handover candidate 510. In some cases, the ME can identify handover candidate 510 as an ESL device included in a plurality of ESL devices associated with the same ESL system or ESL network as the ME. As mentioned previously, the ME may identify handover candidate 510 as an ESL device such as a rail controller or an active BLE tracker that is in need of handover.

For example, the ME may determine that the handover candidate 510 is in need of handover from its current serving $AP_1$ 502 to a target AP that is different from the current serving $AP_1$ 502. In some aspects, the handover candidate 510 can be identified or otherwise determined based on RSSI information and/or various other sensor state information associated with one or more of the handover candidate 510 and the current serving $AP_1$ 502. For example, the handover candidate 510 can be identified based on determining (e.g., by the ME) that the RSSI information and/or sensor state information associated with current serving $AP_1$ 502 and handover candidate 510 is greater than a one or more pre-determined thresholds, is less than one or more pre-determined thresholds, etc. In some examples, the RSSI information and/or sensor state information associated with current serving $AP_1$ 502 and handover candidate 510 can be provided to the ME by one or more of the APs (e.g., one or more of serving $AP_1$ 502, target $AP_2$ 504, target $AP(s)_N$ 508, etc.

In some examples, based on the ME identifying the handover candidate 510 at block 522, the ME can obtain information associated with the handover candidate 510. For example, the ME can obtain information associated with the handover candidate 510 from the current serving $AP_1$ 502 that is associated with the handover candidate 510. In some cases, the information associated with the handover candidate 510 can include a channel map information, an access address information, a current PA (periodic advertisement) event counter information, and a group ID information. For example, the serving $AP_1$ 502 can transmit (e.g., to the ME) information indicative of the {channel map, access address, current paEventCounter, group_id} that is associated with the handover candidate 510 and/or the wireless communications between serving $AP_1$ 502 and handover candidate 510.

The ME can notify each AP of the plurality of APs associated with the ESL system of the information associated with handover candidate 510. For example, at block 524, the ME can notify the target $AP_2$ 504 of handover scan schedule information, at block 528 the ME can notify the target $AP(s)_N$ 508 of the handover scan schedule information, etc. In some aspects, the ME can notify each AP of the plurality of APs (e.g., each target AP) of the same handover scan schedule information. Additionally, the ME can notify each AP of the plurality of APs simultaneously of the handover scan schedule information. In one illustrative example, the handover scan schedule information can include the same {channel_map, access address, current paEventCounter, group_id} information that the ME previously obtained from the currently serving $AP_1$ 502. The handover scan schedule information may additionally include a time to trigger (TTT) information, such that the handover scan schedule information comprises {channel_map, access address, current paEventCounter, group_id, TTT} information.

The TTT information can be indicative of a total quantity of scans that each AP (e.g., of the plurality of APs) will schedule and/or perform for the handover candidate 510. For example, the TTT information included in the handover scan schedule information provided to each of the APs (e.g., at blocks 524, 528) can indicate the quantity of scans to be scheduled by each AP, wherein the APs perform the scheduled scans concurrently (e.g., based on the APs being included in a fully synchronized ESL network). In some examples, the TTT information can be a time value indicative of a time period or time window during which each AP will schedule or perform simultaneous (e.g., concurrent) scans for the handover candidate 510. For example, the ESL system and the plurality of APs 502, 504, 508 can be associated with a pre-determined time window size, such as 1.6 seconds. Based on the TTT information indicating a total time (e.g., quantity of seconds) during which scans will be scheduled and performed for handover candidate 510, each AP can determine the quantity of scans to perform and/or can determine timing information for performing each scheduled scan concurrently with the remaining APs. For example, each AP may perform one scan per 1.6 s time window, wherein each scan is performed at the same relative time slot (e.g., same relative time offset to the beginning and/or end) of the 1.6 s time window. As illustrated, a first time window can begin at time T, a second time window can begin at time T+1.6 s, a third time window can begin at time T+3.2 s, a fourth time window can begin at time T+4.8 s, etc.

In some aspects, the ME can determine a handover decision after the TTT has elapsed. For example, after the TTT, the ME can select one of the target APs 504, 508 as the new serving AP for the handover of handover candidate 510, as will be described in greater depth below.

Based on receiving the notification of the handover scan schedule information (e.g., from the ME), each target AP can perform a channel scan at a plurality of scheduled scan times determined based on the TTT information included in the handover scan schedule information. In one illustrative example, each target AP can determine the plurality of scheduled scan times such that the plurality of scheduled scan times are included in a respective upcoming schedule associated with the group ID of the handover candidate 510. For example, the plurality of channel scans performed by each target AP based on the TTT information can be included in an upcoming schedule associated with handover candidate 510's group_id (e.g., wherein the TTT information and handover candidate 510 group_id information are both determined from the handover scan schedule information received at each target AP from the ME).

In some aspects, each target AP can use the TTT information and handover candidate 510 group_id information to perform one or more channel scans on (e.g., using) a calculated channel index. For example, the calculated channel index can be determined using some, or all, of the handover scan schedule information transmitted to each target AP by the ME. In one illustrative example, the calculated channel index can be determined using {channel_map, access address, paEventCounter+X, group_id} information associated with the handover candidate 510. The calculated channel index used by each target AP can be different, such that each target AP of the plurality of APs will perform the channel scan for the handover candidate 510 on a different (and pre-determined or coordinated) channel.

In some examples, based on successfully accepting the handover scan schedule information (e.g., from the ME) associated with the identified handover candidate 510 can respond with an acknowledgement to the ME. In one illustrative example, the handover scan schedule can be associated with each target AP performing a channel scan for a pre-determined packet that will be transmitted by the handover candidate 510 (e.g., at a time determined based on the TTT information), using the calculated channel index determined by each target AP of the plurality of APs.

In one illustrative example, each target AP of the plurality of APs can transmit a message to the ME indicative of the target AP successfully accepting the scheduled handover scan for an AUX_SYNC_IND packet that will be transmitted by the handover candidate 510 (e.g., the pre-determined packet can be an AUX_SYNC_IND packet).

In some aspects, the ME can direct the handover candidate 510's serving AP (e.g., serving $AP_1$ 502) to schedule an AUX_SYNC_IND packet for the handover candidate 510. For example, as illustrated in the example handover 500 of FIG. 5, the serving $AP_1$ 502 can transmit an AUX_SYNC_IND packet 521*a* to handover candidate 510 scheduling an upcoming AUX_SYNC_IND packet 531*a* to be transmitted by handover candidate 510.

Based on receiving the transmitted AUX_SYNC_IND packet 521*a* from serving $AP_1$ 502 (e.g., as received AUX_SYNC_IND packet 521*b*), the handover candidate 510 can subsequently generate and transmit a scheduled AUX_SYNC_IND packet 531*a* at the scheduled time (e.g., based on the TTT information of the handover scan schedule information) at which the target APs will perform their respective channel scans to determine energy information measured by each respective target AP receiving the AUX_SYNC_IND packet 531*a* transmitted by the handover candidate 510.

For example, the AUX_SYNC_IND packet 531*a* transmitted by handover candidate 510 can be generated in response to the handover candidate 510 receiving the scheduling AUX_SYNC_IND packet 521*a* transmitted by the currently serving $AP_1$ 502.

As illustrated, the scheduling AUX_SYNC_IND packet 521*a* transmitted by currently serving $AP_1$ 502 to handover candidate 510 can be transmitted in the first time window T at a time associated with the handover candidate 510's group (e.g., indicated as the "Group_N" timing within each of the time windows). The responsive AUX_SYNC_IND packet 531*a* transmitted by the handover candidate 510 in the second time window T+1.6 s can be transmitted using the same "Group_N" timing within the second window T+1.6 s (e.g., the packets 521*a* and 531*a* can both be transmitted using the same relative "Group_N" time slot within their respective first and second time windows).

Because the plurality of APs included in the ESL system are fully synchronized (e.g., based at least in part on each AP of the plurality of APs receiving the same handover scan schedule information from the ME at blocks 524, 528), each AP of the plurality of APs can wake up at the same time within the second time window T+1.6 s (e.g., also referred to as the second frame). For example, each AP of the plurality of APs can wake up at the same time slot, associated with the handover candidate 510's group_id information (e.g., "Group_N" time slot), within the second frame T+1.6 s and measure (or attempt to measure) the transmitted AUX_SYNC_IND packet 531*a* that is transmitted by the handover candidate 510. As mentioned previously, each AP of the plurality of APs can measure (or attempt to measure) the transmitted AUX_SYNC_IND packet 531*a* at a different frequency, determined as the channel_index information associated with each AP of the plurality of APs.

In one illustrative example, each target AP 504, 508 can measure or otherwise determine energy information associated with receiving the AUX_SYNC_IND response packet 531*a* transmitted by handover candidate 510. For example, each target AP can measure or otherwise determine RSSI information associated with receiving the AUX_SYNC_IND response packet 531*a* transmitted by handover candidate 510 at the schedule handover channel scan time (e.g., the "Group_N" time slot) within the second frame T+1.6 s.

In some aspects, the serving $AP_1$ 502 can receive the transmitted AUX_SYNC_IND response packet 531*a* as a received AUX_SYNC_IND packet 531*d* using a unique channel_index associated with serving $AP_1$ 502. The serving $AP_1$ 502 can measure or otherwise determine an RSSI associated with receiving the received AUX_SYNC_IND packet 531*d* from handover candidate 510 and may report the respective RSSI information to the ME at block 532.

The target $AP_2$ 504 can receive the transmitted AUX_SYNC_IND response packet 531*a* as a received AUX_SYNC_IND packet 531*c* using a unique channel_index associated with target $AP_2$ 504. The target $AP_2$ 504 can measure or otherwise determine an RSSI associated with receiving the received AUX_SYNC_IND packet 531*c* from handover candidate 510 and may report the respective RSSI information to the ME at block 534.

The target $AP(s)_N$ 508 can receive the transmitted AUX_SYNC_IND response packet 531*a* as a received AUX_SYNC_IND packet 531*b* using a unique channel_index associated with target APN 508. The target APN 508 can measure or otherwise determine an RSSI associated with receiving the received AUX_SYNC_IND packet 531*b* from handover candidate 510 and may report the respective RSSI information to the ME at block 538.

Based on receiving the respective energy information (e.g., RSSI information) determined by each AP of the plurality of APs receiving the transmitted AUX_SYNC_IND response packet 531*a* transmitted by handover candidate 510, at block 542 the ME can perform handover decision making to identify, select, or otherwise determine a new serving AP for handover of the handover candidate 510. For example, based on the RSSI information indicated in the respective RSSI measurements 532, 534, 538 received by the ME from the $AP_1$ 502, $AP_2$ 504, and $AP(s)_N$ 508, respectively, the ME can determine a new serving AP selected from one of the APs 502, 504, 508.

In one illustrative example, the ME can determine the new serving AP as the AP (e.g., included in the plurality of APs) having a best RSSI measurement, indicating that the corresponding AP may establish the strongest connection with the handover candidate 510 if selected as the new serving AP. As depicted in FIG. 5, the ME can cause the currently serving $AP_1$ 502 to generate and transmit an AUX_SYNC_IND packet 541*a* to the handover candidate 510 (e.g., which is received by handover candidate 510 as a received AUX_SYNC_IND packet 541*b*), indicative of the new target AP that has been determined or selected as the new serving AP for handover of the handover candidate 510.

For example, the ME may determine (e.g., based on the respective RSSI measurements 532, 534, 538 received for each AP of the plurality of APs) that target $AP_2$ 504 will be the new serving AP for handover of handover candidate 510. In some cases, target $AP_2$ 504 may be selected by the ME based on the RSSI measurement information 534 associated with target $AP_2$ 504 having the best RSSI out of the respective RSSI measured and indicated to the ME by the remaining APs 502, 508.

The AUX_SYNC_IND packet 541*a* generated and transmitted to handover candidate 510 by the serving AP 502 can indicate to the handover candidate 510 of the identity of the selected new serving AP for the handover (e.g., target $AP_2$ 504). For example, the identity of the selected new serving $AP_2$ 504 can be indicated to handover candidate 510 using the prior serving $AP_1$ 502's AUX_SYNC_IND 541*a*. In one illustrative example, the payload information indicated by the prior serving $AP_1$ 502's AUX_SYNC_IND 541*a* can be extended or augmented to include information associated with the new serving $AP_2$ 504. For example, the AUX_SYNC_IND packet 541*a* transmitted by the prior serving $AP_1$ 502 (e.g., the AUX_SYNC_IND packet 541*b* received by handover candidate 510) can be indicative of {channel_map, paEventCounter, access address, group_id} information associated with the new serving $AP_2$ 504.

At block 554, the handover candidate 510 can use the information associated with new serving $AP_2$ 504, as determined based on the AUX_SYNC_IND packet 541*b* received by the handover candidate 510, to synchronize with the target $AP_2$ 504 (e.g., wherein the target $AP_2$ 504 is the new serving AP for handover candidate 510).

In one illustrative example, at block 554, the handover candidate 510 can synchronize with target $AP_2$ 504 (e.g., can be handed over from prior serving $AP_1$ 502 to new serving $AP_2$ 504) without having to exit low-power mode. For example, after receiving the AUX_SYNC_IND packet 541*b* in the third frame T+3.2 s, the handover candidate 510 can return to low power mode for the remainder of the third frame (e.g., can sleep after reception of AUX_SYNC_IND packet 541*b* is complete).

In the fourth frame T+4.8 s, the handover candidate 510 can utilize the new serving $AP_2$ 504 information, as determined from the previously received AUX_SYNC_IND packet 541*b*, to immediately establish a synchronized connection with the new serving $AP_2$ 504. For example, because handover candidate 510 previously received the {channel_map, paEventCounter, access address, group_id} information associated with the new serving $AP_2$ 504 (e.g., via the AUX_SYNC_IND packet 541*b* received in the third frame T+3.2 s), the handover candidate 510 can generate and transmit an AUX_SYNC_IND packet 551*a* in the fourth frame T+4.8 s that is already synchronized with the new serving $AP_2$ 504.

For example, based on having already received the {channel_map, paEventCounter, access address, group_id} information associated with the new serving $AP_2$ 504, the handover candidate 510 can immediately establish a synchronized connection with new serving $AP_2$ 504 upon exiting low-power mode to transmit the AUX_SYNC_IND packet 551*a* at the "Group_N" time slot within the fourth frame T+4.8 s (e.g., handover candidate 510 can be handed over from prior serving $AP_1$ 502 to new serving $AP_2$ 504 without exiting low power mode between receiving AUX_SYNC_IND packet 541*b* and the subsequent wake event to transmit AUX_SYNC_IND packet 551*a* in the next frame.

The transmission of AUX_SYNC_IND packet 551 may itself serve to establish a connection and synchronization between handover candidate 510 and new serving $AP_2$ 504, as the connection establishment information and synchronization information that would otherwise be exchanged in dedicated transmission between new serving $AP_2$ 504 and handover candidate 510 (e.g., as described with respect to FIG. 4) is instead provided directly to handover candidate 510 by the ME at block 542.

Similarly, the receipt of AUX_SYNC_IND packet 551*b* at the new serving $AP_2$ 504 can itself serve to establish the connection and synchronization between handover candidate 510 and new serving $AP_2$ 504 because the new serving $AP_2$ 504 receives the AUX_SYNC_IND packet 551*b* with the same parameters (e.g., same channel map, PA event counter, access address, and group ID) that are expected by the new serving $AP_2$ 504 when receiving packets from ESL devices (e.g., such as handover candidate 510) that are connected and synchronized with the new serving $AP_2$ 504.

In some aspects, the systems and techniques described herein can be used to provide handover of ESL devices between APs in an ESL system wherein the handover decision making (e.g., such as the handover decision making performed by the ME at block 542) is implemented using a data channel instead of a legacy channel (e.g., as the legacy channel may be crowded and experience contention between different devices and transmissions simultaneously attempting to get on the legacy channel). Based on using the data channel and not the crowded legacy channel to perform handover of the handover candidate 510, the systems and techniques can minimize or eliminate the impact of channel crowding, interference, etc., that may otherwise negatively impact the handover process.

Additionally, handover measurements (e.g., the RSSI measurements 532, 534, 538) can be performed without additional overhead and/or battery impact to the handover candidate 510. For example, because the ME notifies each AP (e.g., at blocks 524, 538) of a handover scan schedule that utilizes synchronized transmit and receive timing between handover candidate 510 and the plurality of APs 502, 504, 508, the handover candidate 510 can implement handover based on transmitting the AUX_SYNC_IND packet 531*a* at the scheduled time in the scheduled time frame (e.g., second frame T+1.6 s) and receiving the AUX_SYNC_IND packet 541*b* at a scheduled time in the next or subsequent time frame (e.g., third frame T+3.2 s). In one illustrative example, the handover candidate 510 can perform or implement handover without additional overhead or battery impact based on handover candidate 510 only transmitting and receiving at the scheduled wake times (e.g., the "Group_N" time slot) within each time frame, at which the handover candidate 510 would already be triggered to wake (e.g., regardless of the handover operation being performed).

Additionally, handover of handover candidate 510 can be performed between the prior serving $AP_1$ 502 and the selected new serving $AP_2$ 504 without performing connection establishment between handover candidate 510 and the selected new serving $AP_2$ 504. As noted above, in one illustrative example, the systems and techniques can perform handover using fast connection between handover candidate 510 and the selected new serving $AP_2$ 504, based on the handover candidate 510 previously receiving (e.g., from the ME and/or prior serving $AP_1$ 502, the required security and connection information (e.g., artifacts) needed for handover candidate 510 to connect to, synchronize with, and/or communicate with the new serving $AP_2$ 504. In some aspects, using the security and connection artifacts associated with the new serving $AP_2$ 504, the handover candidate 510 can perform handover to new serving $AP_2$ 504 (e.g., can switch its connection from prior serving $AP_1$ 502 to new serving $AP_2$ 504) without performing the existing bi-directional communication establishment message exchange or process.

In another illustrative example, handover can be performed using multiple responses to an AUX_SYNC_IND packet transmitted on a specific group (e.g., group_id). For example, the signaling diagram of FIG. 5, above, depicts an example handover process 500 in which handover can be performed using a response to an AUX_SYNC_IND packet.

Figure 6:
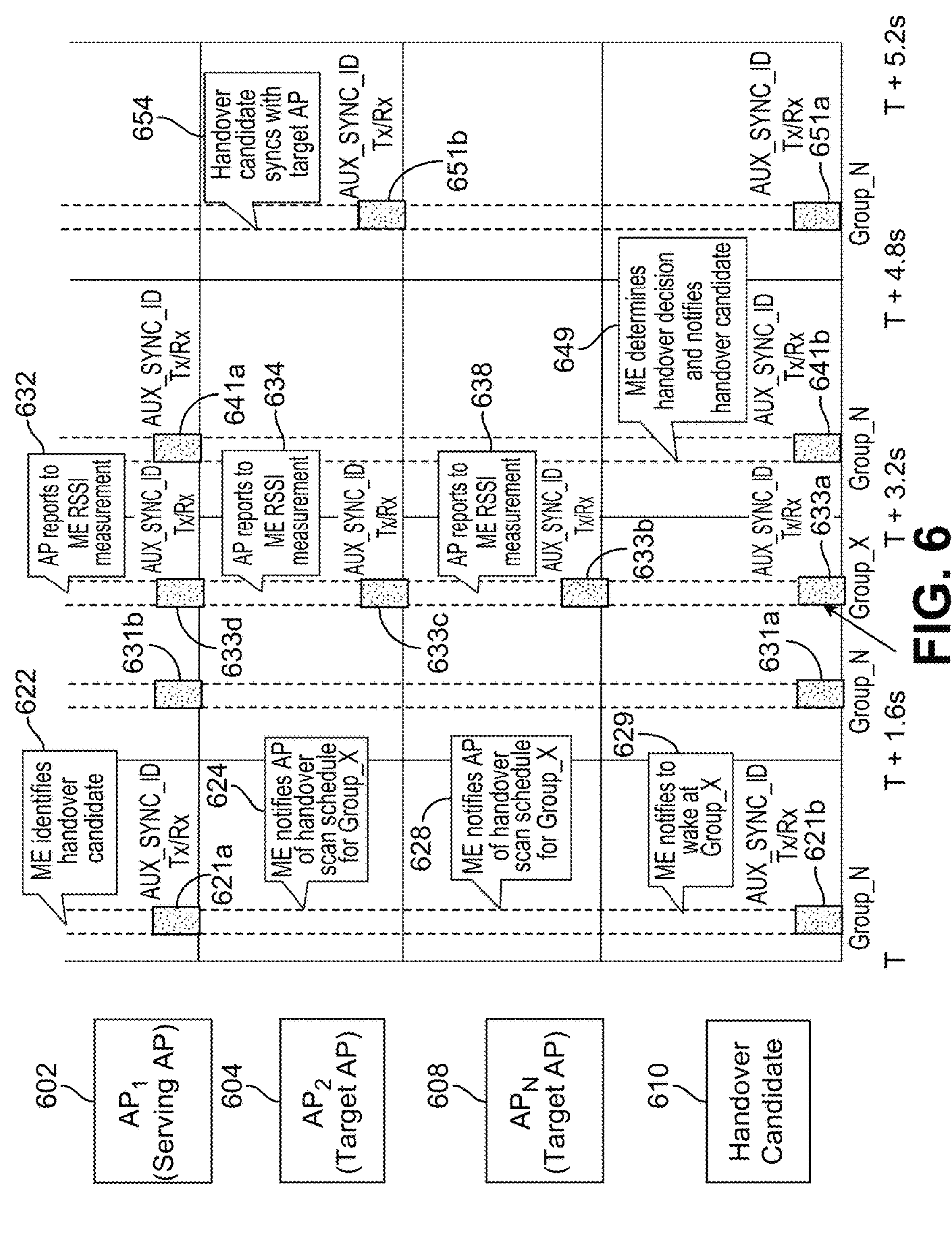
FIG. 6 is a signaling diagram illustrating another example handover based on a pre-determined packet, in accordance with some examples.

FIG. 6 is a signaling diagram illustrating another example handover 600 of an ESL device (e.g., rail controller, active BLE tracker, etc.) from a first AP to a second AP. The example handover 600 can be performed in an ESL system. In one illustrative example, the ESL device handover 600 can be performed based on a pre-determined packet, such as an AUX_SYNC_IND packet. In some aspects, the ESL device handover 600 can be performed based on a handover decision determined at an AP and/or ME included in the ESL system.

In some aspects, an ESL system associated with example handover 600 can be the same as or similar to an ESL system associated with the example handover 500 of FIG. 5. For example, the ESL system associated with example handover 600 of FIG. 6 can include a first AP 602 (e.g., serving $AP_1$) that is the same as or similar to the first AP 502 of FIG. 5; can include a second AP 604 (e.g., target $AP_2$) that is the same as or similar to the second AP 504 of FIG. 5; can include one or more additional APs 608 (e.g., target AP(s)$_N$) that are the same as or similar to the one or more additional APs 508 of FIG. 5; etc. In one illustrative example, the plurality of APs included in the ESL system (e.g., $AP_1$ 602, $AP_2$ 604, additional APN(s) 608) can be synchronized with one another. For example, the ESL system including the plurality of APs can be a fully synchronized network.

The handover candidate 610 can be the same as or similar to the handover candidate 510. For example, handover candidate 610 can be a rail controller, an active BLE tracker, etc., as described above with respect to handover candidate 510 of FIG. 5.

In one illustrative example, the ESL device handover 600 can be used to allow an ESL device (e.g., handover candidate 610) to wake up out of turn within a frame (e.g., exit a low power mode out of turn within a frame). Additionally, the ESL device may wake up in a frame both out of turn and on a group to which the ESL device is not allocated. In some aspects, within a given frame, the ESL device can wake up out of turn on a group to which the ESL device is not allocated and may additionally perform a periodic wake up (e.g., within the same given frame) on the group to which the ESL device is allocated.

At block 622, an ME associated with the ESL system can identify or determine the handover candidate 610, in a manner the same as or similar to that described above with respect to FIG. 5. In some aspects, the primary AP serving the handover candidate 610 (e.g., currently serving $AP_1$ 602) can notify the ME of the {channel_map, access_address, paEventCounter, group_id} information for the handover candidate 610 in a manner that is the same as or similar to that described with respect to FIG. 5.

In one illustrative example, the currently serving $AP_1$ 602 associated with handover candidate 610 can notify the ME of the {channel_map, access_address, paEventCounter, group_id} information for the handover candidate 610 associated with a time interval ahead. For example, the currently serving $AP_1$ 602 can notify the ME, during a first time frame T, of the {channel_map, access_address, paEventCounter, group_id} information that will be associated with or used by the handover candidate 610 at a time interval ahead (e.g., that will be used by the handover candidate 610 in a second time frame T+1.6 s).

The ME can select or otherwise determine a non-crowded group (e.g., "Group_X" depicted in the second frame T+1.6 s) from a plurality of available groups in the second frame T+1.6 s. For example, the ME can select or determine the non-crowded group "Group_X" from a set of 128 different available groups in the second frame T+1.6 s (e.g., wherein each of the 128 available groups has a time duration of 1.6 s/128=12.5 milliseconds (ms)).

At blocks 624 and 628, the ME can notify each AP of the plurality of APs associated with ESL system of the {channel_map, access_address, paEventCounter, Group_X, TTT} information that will be associated with or used by the handover candidate 610 at the "Group_X" time interval ahead (e.g., that will be used by the handover candidate 610 in a second time frame T+1.6 s). The TTT can be time to trigger information that is the same as or similar to the TTT described above with respect to FIG. 5, and the ME can be configured to perform a handover decision (e.g., at block 649) after the TTT has elapsed, again in a manner the same as or similar to that described above with respect to FIG. 5.

Based on receiving the handover scan schedule information for Group_X (e.g., at blocks 624, 628), the respective APs 604, 608 can schedule a channel scan in the second frame T+1.6 s using a channel_index determined based on the handover candidate 610's {channel_map, access_address, paEventCounter, Group_X} information indicated to each respective AP in the handover scan schedule information transmitted by the ME (e.g., in a manner the same as or similar to that described above with respect to the handover scan schedule information of FIG. 5). Here, the plurality of APs 602, 604, 608 can be configured to perform a channel scan, using the respective channel_index uniquely determined by each AP of the plurality of APs, at the Group_X time interval determined and signaled by the ME at blocks 624, 628, rather than performing the channel scan at the Group_N interval normally associated with the handover candidate 610 (e.g., rather than performing the scheduled channel scan(s) at the Group_N interval as described above with respect to the handover candidate 510 of FIG. 5).

For example, the ME can direct the serving $AP_1$ 602 to schedule a transmitted AUX_SYNC_IND packet **633*a* to be transmitted by the handover candidate 610 on Group_X within the second frame T+1.6 s, wherein the transmitted AUX_SYNC_IND packet 633*a* is transmitted by the handover candidate 610 out of turn and on a group (e.g., Group_X rather than Group_N) to which handover candidate 610 is not allocated. In some aspects, the handover candidate 610 may additionally transmit a transmitted AUX_SYNC_IND packet 631*a* within the second frame, using a scheduled periodic wake up that is in turn for handover candidate 610 and is on a group (e.g., Group_N) to which handover candidate 610** is allocated.

In some examples, the handover candidate 610 can generate and transmit the AUX_SYNC_IND packet **633*a* as an AUX_SYNC_IND response packet 633*a* on Group_X. In one illustrative example, the handover candidate 610 can generate and transmit the AUX_SYNC_IND packet 633*a* on all 11 response slots associated with Group_X. Each AP of the plurality of APs (e.g., 602, 604, 608) can, based on the handover scan schedule information for Group_X received at blocks 624 and 628, measure (or attempt to measure) energy information (e.g., RSSI information) associated with the AP receiving the AUX_SYNC_IND response packet 633*a***.

For example, at block 638, the AP(s)$_N$ 608 can measure and report RSSI information to the ME that is indicative of an RSSI determined by AP(s)$_N$ 608 based on receiving the received AUX_SYNC_IND response packet **633*b* on all 11 access slots associated with Group_X. At block 634, the $AP_2$ 604 can measure and report RSSI information to the ME that is indicative of an RSSI determined by $AP_2$ 604 based on receiving the received AUX_SYNC_IND response packet 633*c* on all 11 access slots associated with Group_X. At block 632, the $AP_1$ 602 can measure and report RSSI information to the ME that is indicative of an RSSI determined by $APO_1$ 602 based on receiving the received AUX_SYNC_IND response packet 633*d* on all 11 access slots associated with Group_X. Each AP of the plurality of APs can measure and report RSSI information associated with the receiving the transmitted AUX_SYNC_IND response packet 633*a* to the ME simultaneously (e.g., blocks 632, 634, 638** can be performed concurrently).

In some aspects, the reported RSSI measurements transmitted to the ME by each AP of the plurality of APs can be indicative of up to 11 RSSI measurements (e.g., one RSSI measurement determined by the AP for each respective access slot of the 11 access slots associated with Group_X).

Subsequently, at block 649, based on receiving the respective energy information (e.g., RSSI information) determined by each AP of the plurality of APs receiving the transmitted AUX_SYNC_IND response packet 633*a* transmitted by handover candidate 610, the ME can perform handover decision making to identify, select, or otherwise determine a new serving AP for handover of the handover candidate 610. In some examples, the handover decision associated with block 649 can be the same as or similar to the handover decision associated with block 542 of FIG. 5 (e.g., as described above). Similarly, at block 654, the handover candidate 610 can connect to and/or synchronize with the new target $AP_2$ 604 determined via the handover decision of block 649, in a manner the same as or similar to that in which the handover candidate 510 can connect to and/or synchronize with the new target $AP_2$ 504 determined via the handover decision of block 554 as described above with respect to FIG. 5.

In some aspects, the ESL device handover 600 of FIG. 6 can be used to obtain multiple measurement reports (e.g., RSSI measurement reports) per frame. For example, each AP of the plurality of APs can obtain a first RSSI measurement report based on receiving a first AUX_SYNC_IND response packet 631*a* transmitted by the handover candidate 610 at the scheduled time slot on the handover candidate 610's allocated Group_N (e.g., as described above with respect to FIG. 5). Additionally, each AP of the plurality of APs can obtain a second RSSI measurement report based on receiving a second AUX_SYNC_IND response packet 633*a* transmitted by the handover candidate 610 in the same frame, but at an out of turn time slot and on the Group_X that is not allocated to handover candidate 610. In this manner, some (or all) of the APs of the plurality of APs associated with the ESL system can obtain and transmit to the ME two or more RSSI measurement reports associated with the handover candidate 610 per frame. The ME can subsequently perform the handover decision determination of block 649 using the multiple RSSI measurement reports transmitted by each AP of the plurality of APs.

In some aspects, receiving multiple RSSI measurements reports from an AP per frame can allow the systems and techniques to perform the ESL device handover 600 in a manner that is more robust to a missed reception of the AUX_SYNC_IND response packets (e.g., 631*a*, 633*a*) transmitted to the plurality of APs by the handover candidate 610.

In another illustrative example, the systems and techniques can be used to implement handover of an ESL device (e.g., rail controller, active BLE tracker, etc.) from a first AP to a second AP based on a handover decision determined or performed by the ESL device, as will be described in greater depth below In some aspects, an ESL device handover can be performed using a pre-determined packet (e.g., AUX_SYNC_IND packet) and based on a handover decision determined by an ESL device. In some cases, the ESL device used to determine the handover decision can be a handover candidate ESL device (e.g., the handover decision is determined by an ESL device undergoing handover from a first AP to a selected second AP that is different than the first AP).

In one illustrative example, the example handover can be performed by an ESL device that is included in or associated with a fully synchronized ESL network and/or fully synchronized ESL system. For example, a rail controller or active BLE tracker can perform handover decision making based on determining one or more issues (or potential issues) associated with the currently serving AP of the rail controller or active BLE tracker. In some cases, the ESL device (e.g., rail controller or active BLE tracker) can perform handover decision making based on a repeated lack of AP_SYNC reception between the ESL device and the currently serving AP of the ESL device.

Based on determining the one or more issues or potential issues with the currently serving AP, the rail controller or active BLE tracker can perform discovery of potential candidate APs for handover. For example, the rail controller or active BLE tracker can determine an AUX_SYNC_IND hopping frequency sequence (HFS), which can include a set of indices that the rail controller or active BLE tracker may use to predict the channel used by any available AP in a frame. In some cases, the AUX_SYNC_IND HFS can be determined based on an onboarding payload received from the management entity (ME). For example, for each handover candidate AP, the ESL device (e.g., rail controller or active BLE tracker) can receive an onboarding payload that includes a channel map information, an access address information, and an event counter information. In one illustrative example, for each respective handover candidate AP, the ESL device can receive an onboarding payload that includes or is indicative of a {channel_map, access_address, paEventCounter} information associated with the respective handover candidate AP. For example, the ESL device can receive an onboarding payload indicative of channel map information and an index information associated with each candidate AP with which the ESL device is not currently synchronized.

Based on the HFS included in the onboarding payload(s), the ESL device can begin scanning at a pre-determined rate on the various handover candidate APs. In some examples, the ESL device can at a pre-determined rate selected by the ESL device, based on configuration information and/or using an adaptive determination. In some aspects, the ESL device can scan at a rate of up to 80 Hertz (Hz). Each channel scan can be associated with a respective handover candidate AP of a plurality of handover candidate APs. In some cases, the ESL device can determine energy information associated with each data channel of up to 37 data channels. For example, the ESL device can determine energy information on each data channel included in a set of 37 data channels.

In some aspects, the energy information determined by the ESL device can be Received Signal Strength Indicator (RSSI) information associated with each handover candidate AP of the plurality of handover candidate APs. In one illustrative example, the received energy information (e.g., RSSI information) can be used, by the ESL device, to order the handover candidate APs based on an order of preference and/or based on a handover algorithm to determine one or more handover candidate APs for selection by the ESL device.

Based on the ordered list of handover candidate APs (and/or based on selecting a subset of handover candidates APs of the plurality of handover candidate APs) the ESL device can generate and transmit an Unsolicited Response on one of the channels available at the AUX_SYNC_IND. For example, a slot or a group within a frame can be reserved for the transmission of the Unsolicited Response by the ME associated with the ESL system. In some aspects, the ME can select and reserve the slot or group within the frame(s) based on determining a non-crowded group. In some aspects, the ME can dynamically determine a slot within AP_SYNC that can be used to determine or estimate the load across the handover candidate APs for an upcoming connection to exchange further onboarding payload information. For example, the ME can dynamically determine and/or reserve a slot within AP_SYNC that can be used to perform load balancing across the plurality of handover candidate APs.

The one or more selected handover candidate APs (e.g., selected by the ESL device using the respective RSSI information received from the plurality of handover candidate APs) can generate and transmit an acknowledgement (ACK) based on receiving the unsolicited response transmitted by the ESL device. In some examples, the one or more selected handover candidate APs can subsequently transmit an ACRQ to establish a connection with the ESL device for further exchange of onboarding information (e.g., security exchange, group and/or EID association, etc.). In some aspects, the one or more selected handover candidate APs can generate and transmit one or more messages to the ME indicative of the further exchange of onboarding information between the selected handover candidate AP(s) and the ESL device, and may additionally wait to receive an ACK or other confirmation in response from the ME.

In some examples, following the ACRQ and connection establishment performed by and/or between the one or more selected handover candidate APs and the ESL device, the ESL device can move (e.g., undergo handover) from its currently serving AP to the one or more selected handover candidate APs, wherein the one or more selected handover candidate APs are utilized as the new serving AP(s) for the ESL device. In some aspects, based on the message payload(s) exchanged between the ESL device and the selected handover candidate APs being encrypted, a session key associated with the ESL system can be generated and shared by each AP of the plurality of APs included in the ESL system (e.g., without generating a session key for each AP of the plurality of APs).

In some aspects, the systems and techniques can be used to implement handover of an ESL device (e.g., rail controller, active BLE tracker, etc.) from a first AP to a second AP based on a handover decision determined or performed by the ESL device, as described above. The handover decision can be determined based on using a data channel between an ESL device undergoing handover and one or more APs of the plurality of APs included in the ESL system. In some examples, the handover decision can be based on one or more energy measurements (e.g., RSSI measurements) that can be determined without consuming AP capacity. For example, based on using the ESL device to measure RSSI information for a plurality of handover candidate APs, handover can be performed for the ESL device without additional AP overhead.

Figure 7:
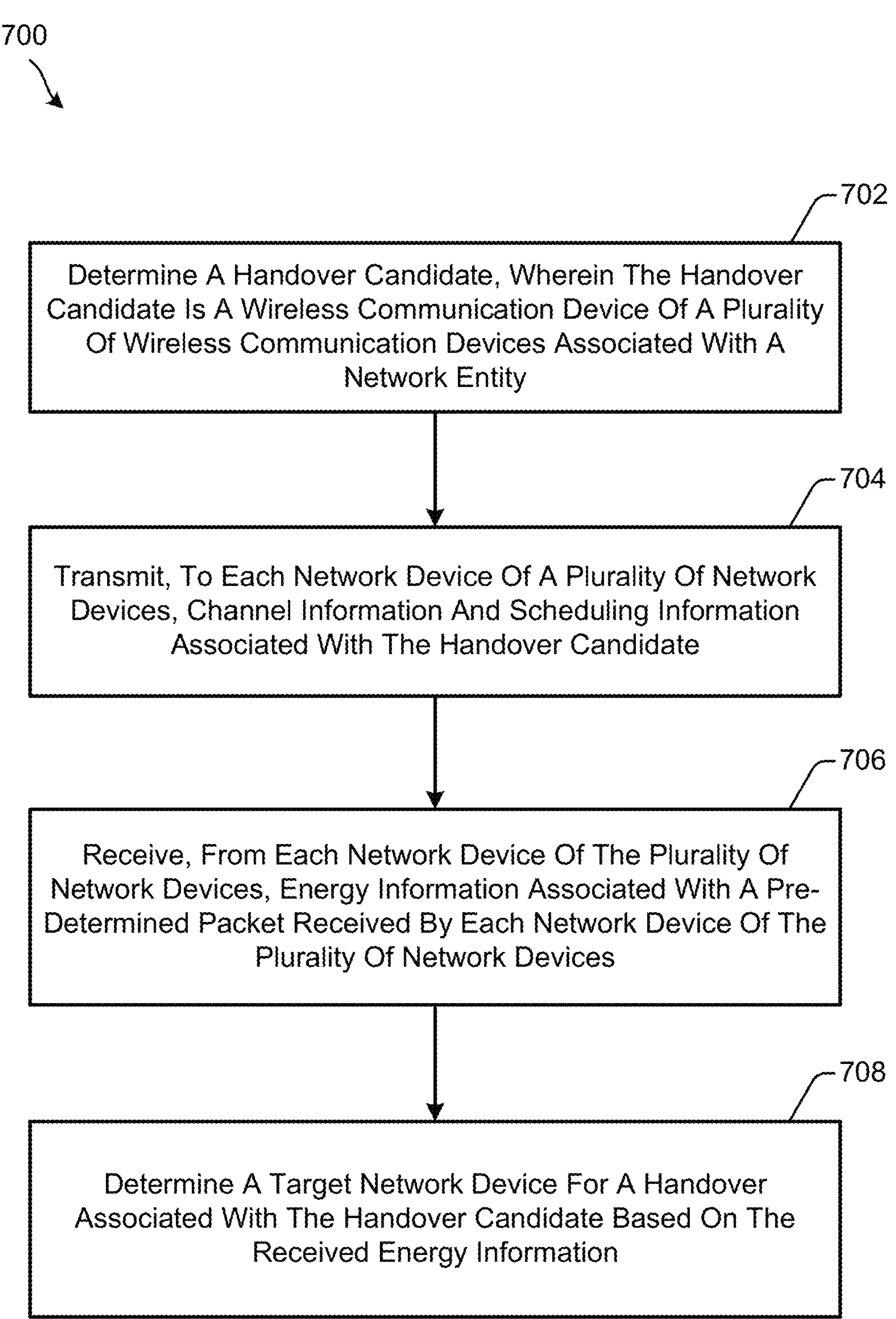
FIG. 7 is a flow chart illustrating an example of a process for wireless communications at a network entity, in accordance with some examples.

FIG. 7 is a flow chart illustrating an example of a process 700 for wireless communications. The process 700 can be performed by a network entity (e.g., such as an ME) and/or a network device (e.g., such as an AP) or by a component or system (e.g., a chipset) thereof. The operations of the process 700 may be implemented as software components that are executed and run on one or more processors (e.g., processor 910 of FIG. 9 or other processor(s)). Further, the transmission and reception of signals by the wireless communications device in the process 700 may be enabled, for example, by one or more antennas and/or one or more transceivers (e.g., wireless transceiver(s)).

At block 702, the process 700 includes determining a handover candidate, wherein the handover candidate is a wireless communication device of a plurality of wireless communication devices associated with the network entity. For example, the network entity can be an access point (AP), such as the AP 110 of FIG. 1; the AP 410 and/or AP 420 of FIG. 4; the AP 502, 504, 508 of FIG. 5; and/or the AP 602, 604, 608 of FIG. 6. In some cases, the network entity is a management entity (ME) and each network device of the plurality of network devices is an AP. For example, the network entity can be an ME such as the ME 130 of FIG. 1.

In some cases, each wireless communication device of the plurality of wireless communication devices can be an electronic shelf label (ESL) device. In some examples, each wireless communication device of the plurality of wireless communication devices can be the same as or similar to the wireless communication device(s) 120 of FIG. 1 and/or the wireless communication devices 305*a*-305*e* of FIG. 3.

In some cases, the handover candidate is a rail controller associated with one or more ESL devices. In some examples, the handover candidate can be the same as or similar to one or more of the handover candidate 510 of FIG. 5 and/or the handover candidate 610 of FIG. 6. In some examples, the handover candidate is an active Bluetooth low energy (BLE) tracker ESL device.

In some examples, the network entity can determine the handover candidate based on obtaining Received Signal Strength Indicator (RSSI) information associated with the plurality of wireless communication devices. For example, the network entity can determine the handover candidate (e.g., an AP) based on RSSI information associated with respective transmissions received at the handover candidate from each wireless communication device of the plurality of wireless communication devices. For example, the handover candidate can measure or otherwise obtain RSSI information corresponding to a respective transmission (e.g., unsolicited ESL responses) received from each ESL of a plurality of ESLs. For example, the network entity can determine the RSSI information based on one or more of the RSSI measurement reports 532, 534, 538 of FIG. 5 and/or one or more of the RSSI measurement reports 632, 634, 638 of FIG. 6. The network entity can determine the handover candidate based on analyzing RSSI information associated with the handover candidate and RSSI information associated with one or more wireless communication devices of the plurality of wireless communication devices. For instance, the network entity can determine the handover candidate and notify the handover candidate at 542 in FIG. 5 or 649 in FIG. 6.

At block 704, the process 700 includes transmitting to each network device of a plurality of network devices, channel information and scheduling information associated with the handover candidate. For example, the network entity can be a serving AP such as the serving AP 502 of FIG. 5 and/or the serving AP 602 of FIG. 6. The plurality of network devices can include the target APs 504 and 508 of FIG. 5, the target APs 604 and 608 of FIG. 6, the handover candidate 510 of FIG. 5, and/or the handover candidate 610 of FIG. 6.

The channel information associated with the handover candidate can be indicative of a channel map associated with the handover candidate, a periodic advertisement (PA) counter associated with the handover candidate, and a group identifier associated with the handover candidate. In some cases, the scheduling information associated with the handover candidate is indicative of a time to trigger (TTT) associated with a schedule of channel scans for the handover candidate.

At block 706, the process 700 includes receiving receive from each network device of the plurality of network devices, energy information associated with a pre-determined packet received by each network device of the plurality of network devices. For example, the energy information can be indicative of Received Signal Strength Indicator (RSSI) information associated with a network device of the plurality of network devices receiving the pre-determined packet. The network entity can determine the RSSI information based on one or more of the RSSI measurement reports 532, 534, 538 of FIG. 5 and/or one or more of the RSSI measurement reports 632, 634, 638 of FIG. 6.

In some examples, the pre-determined packet is received by each network device of the plurality of network devices using a same scheduled time slot, the same scheduled time slot based on the scheduling information associated with the handover candidate. For example, the same scheduled time slot can be a time slot associated with an AUX_SYNC_ID, such as the AUX_SYNC_ID 521, 531, 541, 551 depicted in FIG. 5 and/or the AUX_SYNC_ID 621, 631, 633, 641, 651 depicted in FIG. 6. In some examples, the pre-determined packet is an AUX_SYNC_IND response packet transmitted by the handover candidate, such as one or more of the AUX_SYNC_IND response packet 521*b*, 531*a*, 541*b*, 551 of FIG. 5 and/or the 621*b*, 631*a*, 633*a*, 641*b*, 651*a* of FIG. 6. The AUX_SYNC_IND response packet can be transmitted by the handover candidate at a scheduled transmission time based on the scheduling information associated with the handover candidate.

At block 708, the process 700 includes determining a target network device for a handover associated with the handover candidate based on the received energy information. In some cases, the network entity can transmit, to the handover candidate, handover information indicative of the target network device. For example, the network entity can transmit the handover information 542 of FIG. 5 and/or the handover information 649 of FIG. 6. The handover information can be indicative of a channel map associated with the target network device, a periodic advertisement (PA) counter associated with the target network device, and a group identifier associated with the target network device.

In some cases, the network entity can transmit, to each network device of the plurality of network devices, second channel information associated with the handover candidate and second scheduling information associated with the handover candidate, wherein the second scheduling information is different than the scheduling information. The network entity can receive, from each network device of the plurality of network devices, additional energy information associated with a second pre-determined packet received by each network device of the plurality of network devices. The network entity can determine the target network device for the handover associated with the handover candidate based on the energy information and the additional energy information.

In some cases, the energy information and the additional energy information are received in a same time frame associated with the network entity and the plurality of network devices. In some cases, the pre-determined packet and the second pre-determined packet are each AUX_SYNC_IND response packets transmitted by the handover candidate based on the respective scheduling information and the second scheduling information. In some examples, the pre-determined packet is received by each network device of the plurality of network devices using an allocated group associated with the handover candidate. The second pre-determined packet can be received by each network device of the plurality of network devices using an un-allocated group associated with the handover candidate.

Figure 8:
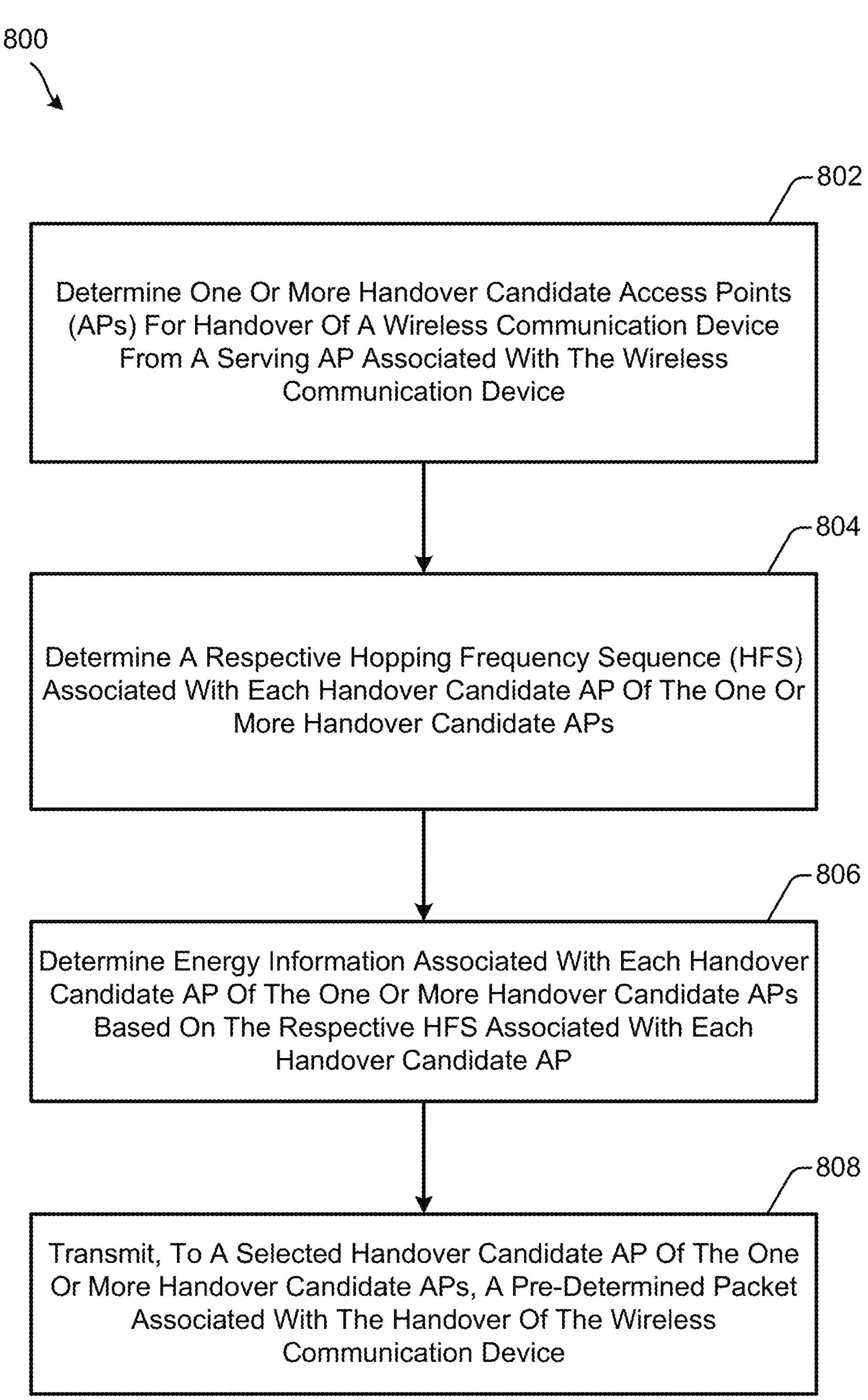
FIG. 8 is a flow chart illustrating an example of a process for wireless communications at a wireless communication device, in accordance with some examples.

FIG. 8 is a flow chart illustrating an example of a process 800 for wireless communications. The process 800 can be performed by a wireless communication device (e.g., such as an electronic shelf label (ESL) device, a rail controller, an active BLE tracker, etc.) or by a component or system (e.g., a chipset) thereof. The operations of the process 800 may be implemented as software components that are executed and run on one or more processors (e.g., processor 910 of FIG. 9 or other processor(s)). Further, the transmission and reception of signals by the wireless communications device in the process 800 may be enabled, for example, by one or more antennas and/or one or more transceivers (e.g., wireless transceiver(s)).

At block 802, the process 800 includes determining one or more handover candidate access points (APs) for handover of a wireless communication device from a serving AP associated with the wireless communication device. For example, the one or more handover candidate APs can be determined by the wireless communication device. The wireless communication device can include one or more of a rail controller associated with one or more electronic shelf label (ESL) devices and/or an active Bluetooth low energy (BLE) tracker ESL device. In some cases, each wireless communication device of the plurality of wireless communication devices can be an electronic shelf label (ESL) device In some examples, each wireless communication device of the plurality of wireless communication devices can be the same as or similar to the wireless communication device(s) 120 of FIG. 1 and/or the wireless communication devices 305*a*-305*e* of FIG. 3. The one or more handover candidate APs and the serving AP can be the same as or similar to one or more of the APs described herein, such as the AP 110 of FIG. 1; the AP 410 and/or AP 420 of FIG. 4; the AP 502, 504, 508 of FIG. 5; and/or the AP 602, 604, 608 of FIG. 6. In some cases, the wireless communication device can determine the selected handover candidate AP based on the energy information associated with each handover candidate AP of the one or more handover candidate APs. In some examples, the wireless communication device can determine the selected handover candidate AP based on sorting the one or more handover candidate APs into an ordered list of handover candidate APs based on the energy information associated with each handover candidate AP of the one or more handover candidate APs.

At block 804, the process 800 includes determining a respective hopping frequency sequence (HFS) associated with each handover candidate of the one or more handover candidate APs.

At block 806, the process 800 includes determining energy information associated with each handover candidate AP of the one or more handover candidate APs based on the respective HFS associated with each handover candidate AP. For example, the energy information associated with each handover candidate AP can include RSSI information, which may be the same as or similar to the RSSI information included in one or more of the RSSI measurement reports 532, 534, 538 of FIG. 5 and/or one or more of the RSSI measurement reports 632, 634, 638 of FIG. 6.

At block 808, the process 800 includes transmitting, to a selected handover candidate AP of the one or more handover candidate APs, a pre-determined packet associated with the handover of the wireless communication device. For example, the pre-determined packet can be an AUX_SYNC_IND response packet transmitted by the wireless communication device to the selected handover candidate AP, such as one or more of the AUX_SYNC_IND response packet 521*b*, 531*a*, 541*b*, 551 of FIG. 5 and/or the 621*b*, 631*a*, 633*a*, 641*b*, 651*a* of FIG. 6.

The network entity, network device, and/or the wireless communication device may include various components, such as one or more input devices, one or more output devices, one or more processors, one or more microprocessors, one or more microcomputers, one or more cameras, one or more sensors, one or more receivers, transmitters, and/or transceivers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of a device configured to perform the process 700 of FIG. 7 and/or the device configured to perform the process 800 of FIG. 8 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 and the process 800 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700, process 800, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
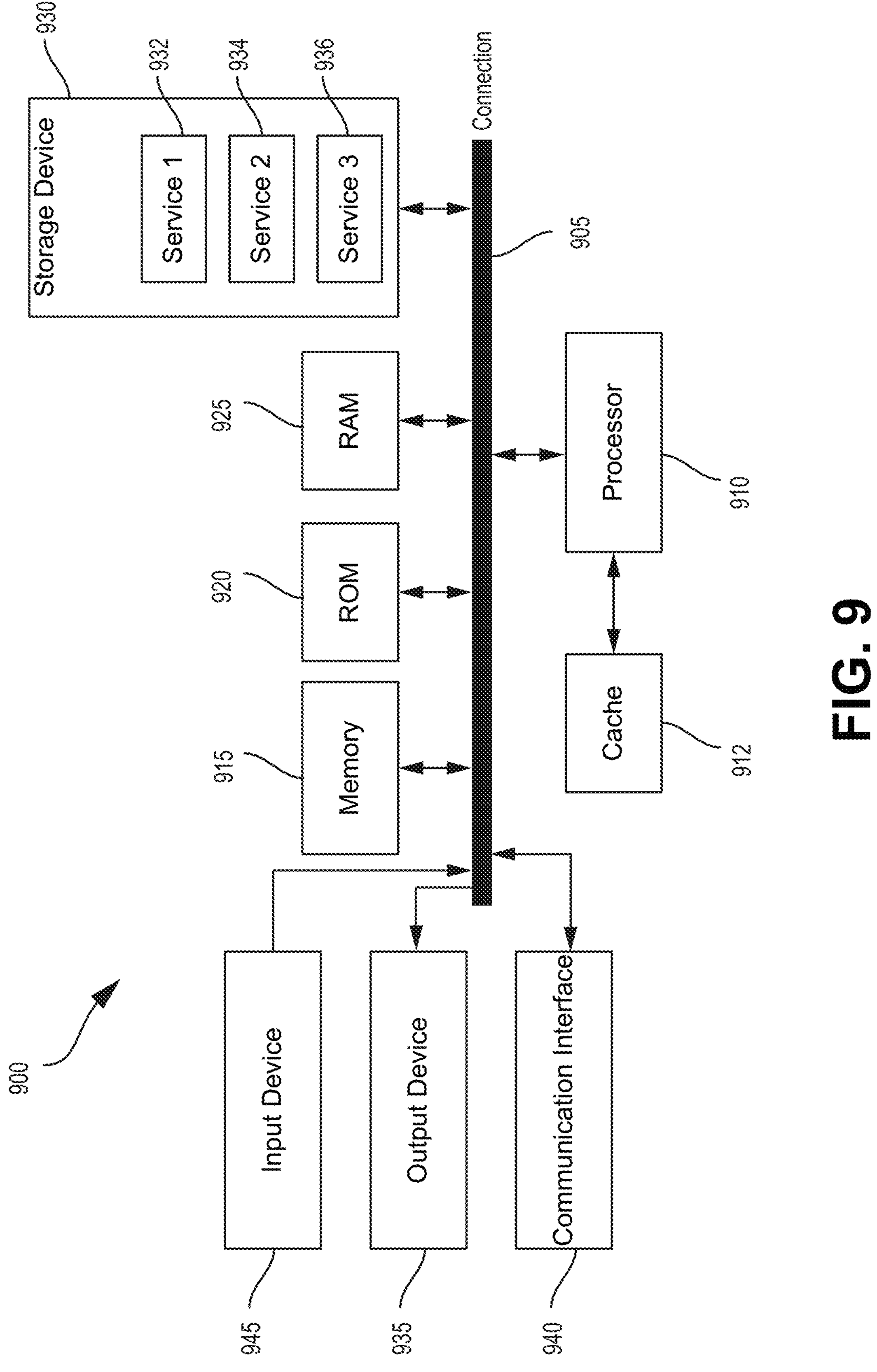
FIG. 9 is a block diagram illustrating an example of a computing system, which may be employed by the disclosed systems and techniques, in accordance with some examples.

FIG. 9 is a block diagram illustrating an example of a computing system 900, which may be employed by the disclosed systems and techniques. In particular, FIG. 9 illustrates an example of computing system 900, which can be, for example, any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that communicatively couples various system components including system memory 915, such as read-only memory (ROM) 920 and random-access memory (RAM) 925 to processor 910. Computing system 900 can include a cache 912 of high-speed memory connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900.

Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 940 may also include one or more range sensors (e.g., LIDAR sensors, laser range finders, RF radars, ultrasonic sensors, and infrared (IR) sensors) configured to collect data and provide measurements to processor 910, whereby processor 910 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Aspects of the Disclosure Include:

Aspect 1. A network entity for wireless communications, the network entity comprising: at least one memory; and at least one processor coupled to the at least one memory and configured to: determine a handover candidate, wherein the handover candidate is a wireless communication device of a plurality of wireless communication devices associated with the network entity; transmit, to each network device of a plurality of network devices, channel information and scheduling information associated with the handover candidate; receive, from each network device of the plurality of network devices, energy information associated with a pre-determined packet received by each network device of the plurality of network devices; and determine a target network device for a handover associated with the handover candidate based on the received energy information.

Aspect 2. The network entity of Aspect 1, wherein the at least one processor is further configured to transmit, to the handover candidate, handover information indicative of the target network device.

Aspect 3. The network entity of Aspect 2, wherein the handover information is indicative of a channel map associated with the target network device, a periodic advertisement (PA) counter associated with the target network device, and a group identifier associated with the target network device.

Aspect 4. The network entity of any of Aspects 1 to 3, wherein the energy information is indicative of a Received Signal Strength Indicator (RSSI) information associated with a network device of the plurality of network devices receiving the pre-determined packet.

Aspect 5. The network entity of any of Aspects 1 to 4, wherein the pre-determined packet is received by each network device of the plurality of network devices using a same scheduled time slot, the same scheduled time slot based on the scheduling information associated with the handover candidate.

Aspect 6. The network entity of any of Aspects 1 to 5, wherein the pre-determined packet is an AUX_SYNC_IND response packet transmitted by the handover candidate.

Aspect 7. The network entity of Aspect 6, wherein the AUX_SYNC_IND response packet is transmitted by the handover candidate at a scheduled transmission time, the scheduled transmission time based on the scheduling information associated with the handover candidate.

Aspect 8. The network entity of any of Aspects 1 to 7, wherein the network entity is an access point (AP).

Aspect 9. The network entity of any of Aspects 1 to 8, wherein the network entity is a management entity (ME) and each network device of the plurality of network devices is an access point (AP).

Aspect 10. The network entity of any of Aspects 1 to 9, wherein each wireless communication device of the plurality of wireless communication devices is an electronic shelf label (ESL) device.

Aspect 11. The network entity of any of Aspects 1 to 10, wherein the handover candidate is a rail controller associated with one or more electronic shelf label (ESL) devices.

Aspect 12. The network entity of any of Aspects 1 to 11, wherein the handover candidate is an active Bluetooth low energy (BLE) tracker ESL device.

Aspect 13. The network entity of any of Aspects 1 to 12, wherein, to determine the handover candidate, the at least one processor is configured to: obtain Received Signal Strength Indicator (RSSI) information associated with the plurality of wireless communication devices; and determine the handover candidate based on analyzing RSSI information associated with the handover candidate and RSSI information associated with one or more wireless communication devices of the plurality of wireless communication devices.

Aspect 14. The network entity of any of Aspects 1 to 13, wherein the channel information associated with the handover candidate is indicative of a channel map associated with the handover candidate, a periodic advertisement (PA) counter associated with the handover candidate, and a group identifier associated with the handover candidate.

Aspect 15. The network entity of any of Aspects 1 to 14, wherein the scheduling information associated with the handover candidate is indicative of a time to trigger (TTT) associated with a schedule of channel scans for the handover candidate.

Aspect 16. The network entity of any of Aspects 1 to 15, wherein the at least one processor is further configured to: transmit, to each network device of the plurality of network devices, second channel information associated with the handover candidate and second scheduling information associated with the handover candidate, wherein the second scheduling information is different than the scheduling information; and receive, from each network device of the plurality of network devices, additional energy information associated with a second pre-determined packet received by each network device of the plurality of network devices.

Aspect 17. The network entity of Aspect 16, wherein the at least one processor is further configured to: determine the target network device for the handover associated with the handover candidate based on the energy information and the additional energy information.

Aspect 18. The network entity of Aspect 17, wherein the energy information and the additional energy information are received in a same time frame associated with the network entity and the plurality of network devices.

Aspect 19. The network entity of any of Aspects 16 to 18, wherein the pre-determined packet and the second pre-determined packet are each AUX_SYNC_IND response packets transmitted by the handover candidate based on the respective scheduling information and the second scheduling information.

Aspect 20. The network entity of any of Aspects 16 to 19, wherein: the pre-determined packet is received by each network device of the plurality of network devices using an allocated group associated with the handover candidate; and the second pre-determined packet is received by each network device of the plurality of network devices using an un-allocated group associated with the handover candidate.

Aspect 21. A wireless communication device for wireless communications, the wireless communication device comprising: at least one memory; and at least one processor coupled to the at least one memory and configured to: determine one or more handover candidate access points (APs) for handover of the wireless communication device from a serving AP associated with the wireless communication device; determine a respective hopping frequency sequence (HFS) associated with each handover candidate AP of the one or more handover candidate APs; determine energy information associated with each handover candidate AP of the one or more handover candidate APs based on the respective HFS associated with each handover candidate AP; and transmit, to a selected handover candidate AP of the one or more handover candidate APs, a pre-determined packet associated with the handover of the wireless communication device.

Aspect 22. The wireless communication device of Aspect 21, wherein the wireless communication device is one of: a rail controller associated with one or more electronic shelf label (ESL) devices; or an active Bluetooth low energy (BLE) tracker ESL device.

Aspect 23. The wireless communication device of any of Aspects 21 to 22, wherein the at least one processor is configured to determine the selected handover candidate AP based on the energy information associated with each handover candidate AP of the one or more handover candidate APs.

Aspect 24. The wireless communication device of Aspect 23, wherein, to determine the selected handover candidate AP, the at least one processor is configured to: sort the one or more handover candidate APs into an ordered list of handover candidate APs based on the energy information associated with each handover candidate AP of the one or more handover candidate APs.

Aspect 25. A method of wireless communications performed at a network entity, the method comprising: determining a handover candidate, wherein the handover candidate is a wireless communication device of a plurality of wireless communication devices associated with the network entity; transmitting, to each network device of a plurality of network devices, channel information and scheduling information associated with the handover candidate; receiving, from each network device of the plurality of network devices, energy information associated with a pre-determined packet received by each network device of the plurality of network devices; and determining a target network device for a handover associated with the handover candidate based on the received energy information.

Aspect 26. The method of Aspect 25, further comprising transmitting, to the handover candidate, handover information indicative of the target network device.

Aspect 27. The method of Aspect 26, wherein the handover information is indicative of a channel map associated with the target network device, a periodic advertisement (PA) counter associated with the target network device, and a group identifier associated with the target network device.

Aspect 28. The method of any of Aspects 25 to 27, wherein the energy information is indicative of a Received Signal Strength Indicator (RSSI) information associated with a network device of the plurality of network devices receiving the pre-determined packet.

Aspect 29. The method of any of Aspects 25 to 28, wherein the pre-determined packet is received by each network device of the plurality of network devices using a same scheduled time slot, the same scheduled time slot based on the scheduling information associated with the handover candidate.

Aspect 30. The method of any of Aspects 25 to 29, wherein the pre-determined packet is an AUX_SYNC_IND response packet transmitted by the handover candidate.

Aspect 31. The method of Aspect 30, wherein the AUX_SYNC_IND response packet is transmitted by the handover candidate at a scheduled transmission time, the scheduled transmission time based on the scheduling information associated with the handover candidate.

Aspect 32. The method of any of Aspects 25 to 31, wherein the network entity is an access point (AP).

Aspect 33. The method of any of Aspects 25 to 32, wherein the network entity is a management entity (ME) and each network device of the plurality of network devices is an access point (AP).

Aspect 34. The method of any of Aspects 25 to 33, wherein each wireless communication device of the plurality of wireless communication devices is an electronic shelf label (ESL) device.

Aspect 35. The method of any of Aspects 25 to 34, wherein the handover candidate is a rail controller associated with one or more electronic shelf label (ESL) devices.

Aspect 36. The method of any of Aspects 25 to 35, wherein the handover candidate is an active Bluetooth low energy (BLE) tracker ESL device.

Aspect 37. The method of any of Aspects 25 to 36, wherein determining the handover candidate comprises: obtaining Received Signal Strength Indicator (RSSI) information associated with the plurality of wireless communication devices; and determining the handover candidate based on analyzing RSSI information associated with the handover candidate and RSSI information associated with one or more wireless communication devices of the plurality of wireless communication devices.

Aspect 38. The method of any of Aspects 25 to 37, wherein the channel information associated with the handover candidate is indicative of a channel map associated with the handover candidate, a periodic advertisement (PA) counter associated with the handover candidate, and a group identifier associated with the handover candidate.

Aspect 39. The method of any of Aspects 25 to 38, wherein the scheduling information associated with the handover candidate is indicative of a time to trigger (TTT) associated with a schedule of channel scans for the handover candidate.

Aspect 40. The method of any of Aspects 25 to 39, further comprising: transmitting, to each network device of the plurality of network devices, second channel information associated with the handover candidate and second scheduling information associated with the handover candidate, wherein the second scheduling information is different than the scheduling information; and receiving, from each network device of the plurality of network devices, additional energy information associated with a second pre-determined packet received by each network device of the plurality of network devices.

Aspect 41. The method of Aspect 40, further comprising: determining the target network device for the handover associated with the handover candidate based on the energy information and the additional energy information.

Aspect 42. The method of Aspect 41, wherein the energy information and the additional energy information are received in a same time frame associated with the network entity and the plurality of network devices.

Aspect 43. The method of any of Aspects 40 to 42, wherein the pre-determined packet and the second pre-determined packet are each AUX_SYNC_IND response packets transmitted by the handover candidate based on the respective scheduling information and the second scheduling information.

Aspect 44. The method of any of Aspects 40 to 43, wherein: the pre-determined packet is received by each network device of the plurality of network devices using an allocated group associated with the handover candidate; and the second pre-determined packet is received by each network device of the plurality of network devices using an un-allocated group associated with the handover candidate.

Aspect 45. A method of wireless communications performed at a wireless communication device for wireless communications, the method comprising: determining one or more handover candidate access points (APs) for handover of the wireless communication device from a serving AP associated with the wireless communication device; determining a respective hopping frequency sequence (HFS) associated with each handover candidate AP of the one or more handover candidate APs; determining energy information associated with each handover candidate AP of the one or more handover candidate APs based on the respective HFS associated with each handover candidate AP; and transmitting, to a selected handover candidate AP of the one or more handover candidate APs, a pre-determined packet associated with the handover of the wireless communication device.

Aspect 46. The method of Aspect 45, wherein the wireless communication device is one of: a rail controller associated with one or more electronic shelf label (ESL) devices; or an active Bluetooth low energy (BLE) tracker ESL device.

Aspect 47. The method of any of Aspects 45 to 46, further comprising determining the selected handover candidate AP based on the energy information associated with each handover candidate AP of the one or more handover candidate APs.

Aspect 48. The method of Aspect 47, wherein determining the selected handover candidate AP comprises: sorting the one or more handover candidate APs into an ordered list of handover candidate APs based on the energy information associated with each handover candidate AP of the one or more handover candidate APs.

Aspect 49. A non-transitory computer-readable medium including instructions that, when executed by at least one processor, cause the at least one processor to perform operations according to any of Aspects 1 to 20.

Aspect 50. A non-transitory computer-readable medium including instructions that, when executed by at least one processor, cause the at least one processor to perform operations according to any of Aspects 21 to 24.

Aspect 51. A non-transitory computer-readable medium including instructions that, when executed by at least one processor, cause the at least one processor to perform operations according to any of Aspects 25 to 44.

A non-transitory computer-readable medium including instructions that, when executed by at least one processor, cause the at least one processor to perform operations according to any of Aspects 45 to 48.

An apparatus for wireless communication, the apparatus comprising one or more means for performing operations according to any of Aspects 1 to 20.

An apparatus for wireless communication, the apparatus comprising one or more means for performing operations according to any of Aspects 21 to 24.

An apparatus for wireless communication, the apparatus comprising one or more means for performing operations according to any of Aspects 25 to 44.

An apparatus for wireless communication, the apparatus comprising one or more means for performing operations according to any of Aspects 45 to 48.

What is claimed is:

1. A network entity for wireless communications, the network entity comprising:

at least one memory; and at least one processor coupled to the at least one memory and configured to:

determine a handover candidate, wherein the handover candidate is a wireless communication device of a plurality of wireless communication devices associated with the network entity;

transmit, to each network device of a plurality of network devices, channel information and scheduling information associated with the handover candidate;

receive, from each network device of the plurality of network devices, energy information associated with a pre-determined packet received by each network device of the plurality of network devices, wherein the pre-determined packet is received by each network device of the plurality of network devices using a same scheduled time slot based on the scheduling information; and determine a target network device for a handover associated with the handover candidate based on the received energy information.

2. The network entity of claim 1, wherein the at least one processor is further configured to transmit, to the handover candidate, handover information indicative of the target network device.

3. The network entity of claim 2, wherein the handover information is indicative of a channel map associated with the target network device, a periodic advertisement (PA) counter associated with the target network device, and a group identifier associated with the target network device.

4. The network entity of claim 1, wherein the energy information is indicative of a Received Signal Strength Indicator (RSSI) information associated with a network device of the plurality of network devices receiving the pre-determined packet.

5. The network entity of claim 1, wherein the pre-determined packet is an AUX_SYNC_IND response packet transmitted by the handover candidate.

6. The network entity of claim 5, wherein the AUX_SYNC_IND response packet is transmitted by the handover candidate at a scheduled transmission time, the scheduled transmission time based on the scheduling information associated with the handover candidate.

7. The network entity of claim 1, wherein the network entity is an access point (AP).

8. The network entity of claim 1, wherein the network entity is a management entity (ME) and each network device of the plurality of network devices is an access point (AP).

9. The network entity of claim 1, wherein each wireless communication device of the plurality of wireless communication devices is an electronic shelf label (ESL) device.

10. The network entity of claim 1, wherein the handover candidate is a rail controller associated with one or more electronic shelf label (ESL) devices.

11. The network entity of claim 1, wherein the handover candidate is an active Bluetooth low energy (BLE) tracker ESL device.

12. The network entity of claim 1, wherein, to determine the handover candidate, the at least one processor is configured to:

obtain Received Signal Strength Indicator (RSSI) information associated with the plurality of wireless communication devices; and determine the handover candidate based on analyzing RSSI information associated with the handover candidate and RSSI information associated with one or more wireless communication devices of the plurality of wireless communication devices.

13. The network entity of claim 1, wherein the channel information associated with the handover candidate is indicative of a channel map associated with the handover candidate, a periodic advertisement (PA) counter associated with the handover candidate, and a group identifier associated with the handover candidate.

14. The network entity of claim 1, wherein the scheduling information associated with the handover candidate is indicative of a time to trigger (TTT) associated with a schedule of channel scans for the handover candidate.

15. The network entity of claim 1, wherein the at least one processor is further configured to:

transmit, to each network device of the plurality of network devices, second channel information associated with the handover candidate and second scheduling information associated with the handover candidate, wherein the second scheduling information is different than the scheduling information; and receive, from each network device of the plurality of network devices, additional energy information associated with a second pre-determined packet received by each network device of the plurality of network devices.

16. The network entity of claim 15, wherein the at least one processor is further configured to:

determine the target network device for the handover associated with the handover candidate based on the energy information and the additional energy information.

17. The network entity of claim 15, wherein the pre-determined packet and the second pre-determined packet are each AUX_SYNC_IND response packets transmitted by the handover candidate based on the respective scheduling information and the second scheduling information.

18. The network entity of claim 15, wherein:

the pre-determined packet is received by each network device of the plurality of network devices using an allocated group associated with the handover candidate; and the second pre-determined packet is received by each network device of the plurality of network devices using an un-allocated group associated with the handover candidate.

19. The network entity of claim 16, wherein the energy information and the additional energy information are received in a same time frame associated with the network entity and the plurality of network devices.

20. A method of wireless communications performed at a network entity, the method comprising:

determining a handover candidate, wherein the handover candidate is a wireless communication device of a plurality of wireless communication devices associated with the network entity;

transmitting, to each network device of a plurality of network devices, channel information and scheduling information associated with the handover candidate;

receiving, from each network device of the plurality of network devices, energy information associated with a pre-determined packet received by each network device of the plurality of network devices, wherein the pre-determined packet is received by each network device of the plurality of network devices using a same scheduled time slot based on the scheduling information; and determining a target network device for a handover associated with the handover candidate based on the received energy information.

21. The method of claim 20, further comprising transmitting, to the handover candidate, handover information indicative of one or more of the target network device, a channel map associated with the target network device, a periodic advertisement (PA) counter associated with the target network device, or a group identifier associated with the target network device.

22. The method of claim 20, wherein the energy information is indicative of a Received Signal Strength Indicator (RSSI) information associated with a network device of the plurality of network devices receiving the pre-determined packet.

23. The method of claim 20, further comprising:

transmitting, to each network device of the plurality of network devices, second channel information associated with the handover candidate and second scheduling information associated with the handover candidate, wherein the second scheduling information is different than the scheduling information; and receiving, from each network device of the plurality of network devices, additional energy information associated with a second pre-determined packet received by each network device of the plurality of network devices.

24. The method of claim 23, further comprising:

determining the target network device for the handover associated with the handover candidate based on the energy information and the additional energy information.

25. The method of claim 24, wherein the energy information and the additional energy information are received in a same time frame associated with the network entity and the plurality of network devices.

26. The method of claim 23, wherein:

the pre-determined packet is received by each network device of the plurality of network devices using an allocated group associated with the handover candidate; and the second pre-determined packet is received by each network device of the plurality of network devices using an un-allocated group associated with the handover candidate.

27. The method of claim 23, wherein the pre-determined packet and the second pre-determined packet are each AUX_SYNC_IND response packets transmitted by the handover candidate based on the respective scheduling information and the second scheduling information.

28. The method of claim 20, wherein the pre-determined packet is an AUX_SYNC_IND response packet transmitted by the handover candidate.

* * * * *